(12) United States Patent
Jeong et al.

(10) Patent No.: US 11,364,470 B2
(45) Date of Patent: Jun. 21, 2022

(54) FILTER MEDIUM, MANUFACTURING METHOD THEREFOR, AND FILTER UNIT COMPRISING SAME

(71) Applicant: AMOGREENTECH CO., LTD., Gimpo-si (KR)

(72) Inventors: Ui Young Jeong, Incheon (KR); In Yong Seo, Seoul (KR)

(73) Assignee: Amogreentech Co., Ltd., Gimpo-si (KR)

( * ) Notice: Subject to any disclaimer, the term of this patent is extended or adjusted under 35 U.S.C. 154(b) by 276 days.

(21) Appl. No.: 16/632,630

(22) PCT Filed: Jul. 23, 2018

(86) PCT No.: PCT/KR2018/008295
§ 371 (c)(1),
(2) Date: Jan. 21, 2020

(87) PCT Pub. No.: WO2019/017750
PCT Pub. Date: Jan. 24, 2019

(65) Prior Publication Data
US 2020/0215490 A1 Jul. 9, 2020

(30) Foreign Application Priority Data
Jul. 21, 2017 (KR) .................. 10-2017-0092699
Jul. 21, 2017 (KR) .................. 10-2017-0092700

(51) Int. Cl.
*B01D 63/00* (2006.01)
*B01D 63/08* (2006.01)
(Continued)

(52) U.S. Cl.
CPC ........... *B01D 63/081* (2013.01); *B01D 69/02* (2013.01); *B01D 69/06* (2013.01); *B01D 69/10* (2013.01);
(Continued)

(58) Field of Classification Search
CPC .. B32B 7/00; B32B 7/04; B32B 7/045; B32B 7/10; B32B 7/12; B32B 5/22; B32B 5/24;
(Continued)

(56) References Cited

U.S. PATENT DOCUMENTS

| 2009/0120048 A1* | 5/2009 | Wertz | B01D 39/1623 55/522 |
| 2010/0181249 A1* | 7/2010 | Green | B01D 39/1623 210/493.1 |
| 2011/0210081 A1* | 9/2011 | Green | B82Y 30/00 156/308.2 |

FOREIGN PATENT DOCUMENTS

| JP | 2005-029931 A | 2/2005 |
| JP | 2012-532755 A | 12/2012 |

(Continued)

OTHER PUBLICATIONS

Lybrand, "Nanofibers", Topics in Nanomanufacturing, A project of National Nanomanufacturing Network (Year: 2016).*

*Primary Examiner* — Allison G Fitzsimmons
(74) *Attorney, Agent, or Firm* — Rothwell, Figg, Ernst & Manbeck, P.C.

(57) ABSTRACT

A filter medium including: a porous first support; nanofiber webs respectively stacked at the upper and lower parts of the first support, and made of a plurality of nanofibers of which the diameters have a standard deviation of 300 nm or less; and a porous second support interposed between the first support and the nanofiber web. The filter medium is implemented by fibers having uniform diameters, and thus is easily manufactured to have a predetermined pore diameter and simultaneously has excellent uniformity of the pore diameters, thereby having excellent filtering efficiency and being more suitable when selectively separating specific objects. Backwashing is enabled at uniform pressure during backwashing such that high cleaning power is obtained. The (Continued)

filter medium has excellent water permeability and excellent mechanical strength so as to minimize the shape and structural deformation and damage of the filter medium.

8 Claims, 7 Drawing Sheets

(51) Int. Cl.
| | |
|---|---|
| *B01D 69/02* | (2006.01) |
| *B01D 69/06* | (2006.01) |
| *B01D 69/10* | (2006.01) |
| *B01D 71/34* | (2006.01) |
| *D04H 1/728* | (2012.01) |
| *B01D 67/00* | (2006.01) |

(52) U.S. Cl.
CPC ............ *B01D 71/34* (2013.01); *D04H 1/728* (2013.01); *B01D 2325/02* (2013.01); *B01D 2325/04* (2013.01)

(58) Field of Classification Search
CPC ... B32B 5/26; B32B 2250/03; B32B 2250/20; B32B 2250/24; B01D 63/081; B01D 63/00; B01D 63/08; B01D 63/082; B01D 69/00; B01D 69/02; B01D 69/06; B01D 69/10; B01D 69/12; B01D 69/105; B01D 71/34; B01D 39/00; B01D 39/08; B01D 39/14; B01D 39/16; B01D 39/20; B01D 61/00; B01D 67/00; B01D 67/0002; B01D 2239/00; B01D 2239/02; B01D 2239/0216; B01D 2239/01225; B01D 2239/0233; B01D 2239/025; B01D 2239/06; B01D 2239/0604; B01D 2239/0636; B01D 2239/065; B01D 2239/0654; B01D 2239/0668; B01D 2239/10; B01D 2239/1233; B01D 2239/125; D04H 1/728
USPC .... 210/767, 483, 496, 500.1, 500.21, 502.1, 210/503, 504, 505, 506, 507, 508; 442/153, 79, 85, 86, 88, 89, 239, 268, 442/777, 278, 285, 381, 289, 390, 392, 442/394, 400, 415, 416, 417
See application file for complete search history.

(56) References Cited

FOREIGN PATENT DOCUMENTS

| | | |
|---|---|---|
| KR | 10-0512067 B1 | 8/2005 |
| KR | 10-2008-0060263 A | 7/2008 |
| KR | 10-0871440 B1 | 12/2008 |
| KR | 10-2010-0028011 A | 3/2010 |
| KR | 10-2011-0095753 A | 8/2011 |
| KR | 10-2016-0071760 A | 6/2016 |
| KR | 10-2017-0072715 A | 6/2017 |
| WO | WO-2015060655 A1 * | 4/2015 ............ B01D 69/02 |

* cited by examiner

FILTER MEDIUM, MANUFACTURING METHOD THEREFOR, AND FILTER UNIT COMPRISING SAME

CROSS REFERENCE TO RELATED APPLICATION

This application is the national phase entry of International Application No. PCT/KR2018/008295, filed on Jul. 23, 2018, which is based upon and claims priority to Korean Patent Application No. 10-2017-0092699, filed on Jul. 21, 2017, and Korean Patent Application No. 10-2017-0092700, filed on Jul. 21, 2017, the entire contents of which are incorporated herein by reference.

TECHNICAL FIELD

The present invention relates to a filter medium, and more particularly, to a filter medium, a method of manufacturing the same, and a filter unit including the same.

BACKGROUND

Separation membranes may be classified into microfiltration (MF) membranes, ultrafiltration (UF) membranes, nanofiltration (NF) membranes, and reverse osmosis (RO) membranes according to a pore size.

Although the above-exemplified separation membranes have differences in usages and pore sizes, the separation membranes are filtration media formed of a fiber or porous polymer filtration media or have the form of a composite membrane thereof in common.

In general, the porous polymer filtration media is manufactured by forming pores in a polymer membrane or a polymer hollow fiber using a separate pore-forming agent included in the production of a solution by sintering the pore-forming agent or dissolving the pore-forming agent in an external coagulating solution. On the other hand, the filtration media formed of the fiber are generally manufactured by accumulating manufactured staple fibers and then applying heat/pressure or the like thereto, or by spinning the staple fibers and concurrently applying heat/pressure or the like thereto.

A typical example of the filtration media formed of the fiber is a non-woven fabric, and generally, pores of the non-woven fabric are controlled by a diameter of a staple fiber, a basis weight of a medium, and the like. However, a diameter of a staple fiber included in a general non-woven fabric is in the unit of microns, and thus there is a limitation in implementing a separation membrane having a fine and uniform pore structure only by controlling the diameter and basis weight of a fiber. Accordingly, only using a general non-woven fabric, it is possible to implement only a separation membrane of an MF membrane level, and it is difficult to implement a separation membrane of a UF or NF membrane level for filtering finer particles.

A method designed to address such a problem is to use a separation membrane manufactured using an ultra-fine fiber having a nanoscale fiber diameter. However, it is difficult to manufacture an ultra-fine fiber having a nanoscale diameter by spinning only once in a general fiber spinning process such as a wet-spinning process, and there are problems such as inconvenience of obtaining an island component, which is an ultra-fine fiber, by separately eluting a sea component after being spun with sea-island yarn or the like, a cost increase, and extension of manufacturing time. Accordingly, recently, there has been a tendency to manufacture a large number of filtration media formed of a fiber having a nanoscale diameter by directly spinning the fiber through electrospinning.

Meanwhile, it is very difficult to spin nanofibers so that the nanofibers have a uniform diameter in a process even when determining the desired diameter of a fiber and adjusting various conditions because the diameter of the manufactured fiber may be changed according to various conditions while electrospinning the nanofibers. However, in the case of a nano web formed by integrating nanofibers having non-uniform diameters, the diameters of pores included in the nano-web may also be non-uniform, a pore size distribution of the pores provided in the nano-web is dispersed very widely, for example, the diameters of pores formed of nanofibers with a relatively great diameter is formed to be great and the diameters of pores formed of nanofibers with a relatively small diameter is formed to be small, and it is not easy to adjust the pore diameter of the nano-web.

When a nano-web in which a pore size distribution of pores is widely dispersed is used as a water treatment medium, there is a concern that selective separation efficiency for materials having a specific particle size may be lowered, and cleaning power may be reduced when backwashing. Accordingly, there is an urgent need to develop a filter medium that has solved such problems.

SUMMARY OF THE INVENTION

The present invention is directed to providing a filter medium that has high filtration efficiency and, particularly, is more suitable for selectively separating a specific object, and a manufacturing method thereof.

Further, the present invention is also directed to providing a filter medium capable of backwashing when applied to a water treatment process and a manufacturing method thereof.

Furthermore, the present invention is also directed to providing a flat filter unit and a filter module that are variously applicable in water treatment fields through the above-described filter medium.

Technical Solution

One aspect of the present invention provides a filter medium including a porous first support, nanofiber webs each stacked above and below the first support and formed of a plurality of nanofibers having diameters whose standard deviation is 300 nm or less, and porous second supports interposed between the first support and the nanofiber web.

The plurality of nanofibers provided in the nanofiber web may have diameters whose standard deviation is 200 nm or less The nanofiber may have an average fiber diameter of 0.05 µm to 1 µm.

The nanofiber web may have an average pore diameter of 100 nm to 1000 nm.

A volume of pores having a pore diameter within an average pore diameter ±10% may be 60% or more of the total volume of pores of the nanofiber web.

A volume of pores having a pore diameter within an average pore diameter ±5% may be 45% or more of the total volume of pores of the nanofiber web.

The nanofiber web may have a porosity of 60% to 90%, a basis weight of 0.05 g/m² to 20 g/m², and a thickness of 0.5 µm to 200 µm.

The first support and the second support may each be independently selected from the group consisting of a nonwoven fabric, a fabric, and a knitted fabric.

The first support may have a basis weight of 250 g/m² to 800 g/m² and a thickness of 2 mm to 8 mm, and the second support may have a basis weight of 35 g/m² to 80 g/m² and a thickness of 150 μm to 250 μm.

The second support may include a second composite fiber including a support component and a low melting point component and disposed such that at least a portion of the low melting point component is exposed at an outer surface thereof, and the low melting point component of the second composite fiber may be fused to the nanofiber web.

The first support may include a first composite fiber including a support component and a low melting point component and disposed such that at least a portion of the low melting point component is exposed at an outer surface thereof, and the low melting point component of the first composite fiber and the low melting point component of the second composite fiber may be fused to each other to bond the first support and the second support.

The first support may have an average fiber diameter of 5 μm to 50 μm, and the second support may have an average fiber diameter of 5 μm to 30 μm.

Another aspect of the present invention provides a method of manufacturing a filter medium, the method including (1) manufacturing a laminate including a nanofiber web formed on one surface of a second support by discharging a spinning solution containing a fiber-forming component to one surface of the second support using a spinning nozzle while supplying air in the same direction as a spinning direction of the spinning nozzle in a vicinity of an outer circumference of the spinning nozzle, and (2) laminating by placing the laminate on each of an upper surface and a lower surface of a first support such that the second support is in contact with each of the upper and lower surfaces of the first support, wherein the nanofiber web is formed of nanofibers having diameters whose standard deviation is 300 nm or less.

In the operation (1), nanofibers may be electrospun on one surface of the second support and then the second support may be subjected to at least one of heat and pressure to be laminated with the nanofiber web, thereby manufacturing the laminate.

Still another aspect of the present invention provides a filter medium including a porous first support, nanofiber webs each stacked above and below the first support and having the tensile strength in a mechanical direction (MD direction) greater than the tensile strength in a transverse direction (TD direction), and porous second supports interposed between the first support and the nanofiber webs.

A tensile strength ratio between the tensile strength in the TD direction and the tensile strength in the MD direction of the nanofiber web may be in a range of 1:1.2 to 6.5.

The tensile strength of the nanofiber web in the MD direction may be 0.8 kg/mm² to 7.0 kg/mm².

The tensile strength of the nanofiber web in the TD direction may be 0.3 kg/mm² to 5.0 kg/mm².

The nanofiber web may have a value of each of Equation 1 and Equation 2 of 0.1 or less.

(Standard deviation of tensile strength in MD direction)/(average tensile strength in MD direction)  [Equation 1]

(Standard deviation of tensile strength in TD direction)/(average tensile strength in TD direction).  [Equation 2]

The nanofiber may have an average fiber diameter of 0.05 μm to 1 μm.

The nanofiber web may have an average pore diameter of 100 nm to 5000 nm.

The nanofiber web may have a porosity of 40% to 90%, a basis weight of 0.05 g/m² to 20 g/m², and a thickness of 0.5 μm to 200 μm.

The first support and the second support may each be independently selected from the group consisting of a nonwoven fabric, a fabric, and a knitted fabric.

The first support may have a basis weight of 250 g/m² to 800 g/m² and a thickness of 2 mm to 8 mm, and the second support may have a basis weight of 35 g/m² to 100 g/m² and a thickness of 100 μm to 400 μm.

The second support may include a second composite fiber including a support component and a low melting point component and disposed such that at least a portion of the low melting point component is exposed at an outer surface thereof, and the low melting point component of the second composite fiber may be fused to the nanofiber web.

The first support may include a first composite fiber including a support component and a low melting point component and disposed such that at least a portion of the low melting point component is exposed at an outer surface thereof, and the low melting point component of the first composite fiber and the low melting point component of the second composite fiber may be fused to each other to bond the first support and the second support.

The first support may have an average fiber diameter of 5 μm to 50 μm, and the second support may have an average fiber diameter of 5 μm to 30 μm.

Yet another aspect of the present invention provides a method of manufacturing a filter medium including (1) laminating a nanofiber web and a second support, and (2) laminating by placing the laminated nanofiber web and second support on each of both surfaces of a first support such that the second support is in contact with the first support, wherein the nanofiber web has tensile strength in an MD direction greater than tensile strength in a TD direction.

Yet another aspect of the present invention provides a flat filter unit including the above-described filter medium and a support frame including a flow path configured to allow a filtrate filtered in the filter medium to be discharged to the outside and supporting an edge of the filter medium.

Advantageous Effects

According to the present invention, since a filter medium is implemented with fibers having a uniform diameter, it is easy to be manufactured to have a predetermined pore diameter and, at the same time, to have high uniformity of the pore diameter, and thus, the filter medium has high filtration efficiency and is more suitable for selectively separating specific objects.

In addition, backwashing can be performed with uniform pressure during backwashing, and thus high cleaning power can be obtained. Furthermore, since water permeability is high and mechanical strength is high, during a water treatment operation, deformation and damage of the shape and structure of a filter medium can be minimized, and a flow path can be smoothly secured to have a high flow rate.

In addition, since a filter medium can have an extended use period even at high pressure, which is applied during backwashing, due to high durability of the filter medium, the filter medium can be variously applied in various water treatment fields.

BRIEF DESCRIPTION OF THE DRAWINGS

FIGS. 4A and 4B are images of a nanofiber web included in one embodiment of the present invention, wherein FIG. 4A is a scanning electron microscope (SEM) image of a surface of a nanofiber web, and FIG. 4B is an SEM image of a cross section of the nanofiber web.

FIGS. 6A-6B are a set of views illustrating a flat filter unit according to one embodiment of the present invention, wherein FIG. 6A is a perspective view of the filter unit, and FIG. 6B is a schematic diagram illustrating a filtration flow on the basis of a cross-sectional view taken along a boundary line X-X' in FIG. 6A.

DETAILED DESCRIPTION

Figure 1:
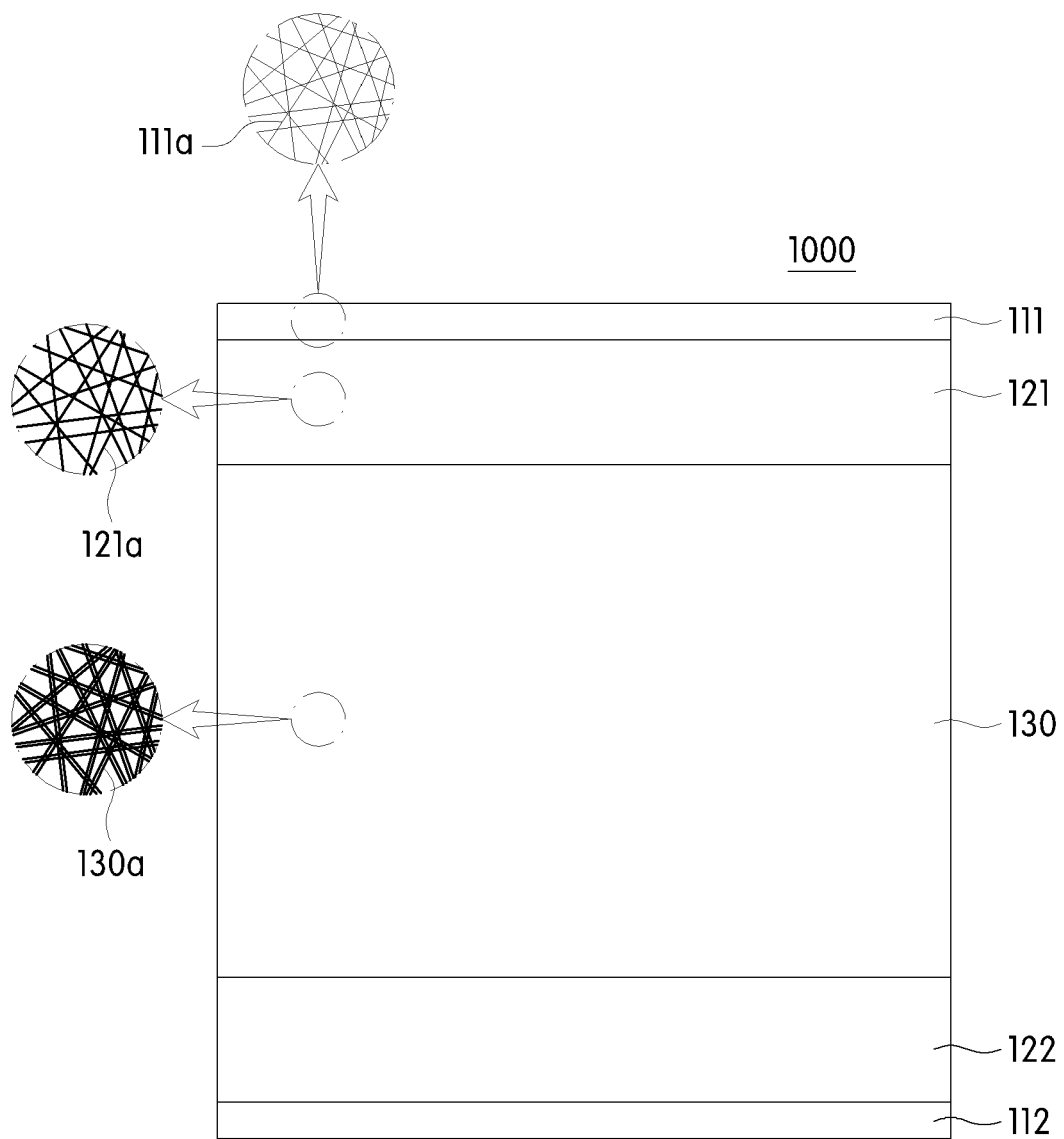
FIG. 1 is a cross-sectional view illustrating a filter medium according to one embodiment of the present invention.

Hereinafter, embodiments of the present invention will be described in detail below with reference to the accompanying drawings so that those skilled in the art can easily implement the invention. The present invention may be implemented in several different forms and is not limited to embodiments described herein. Parts irrelevant to description are omitted in the drawings in order to clearly describe the embodiments of the present invention, and like reference numerals refer to like elements throughout the specification.

As illustrated in FIG. 1, a filter medium 1000 according to one embodiment of the present invention includes: a porous first support 130; nanofiber webs 111 and 112 stacked above and below the first support 130, respectively, and formed of a plurality of nanofibers 111a; and porous second supports 121 and 122 interposed between the first support 130 and the nanofiber webs 111 and 112.

Figure 4A:
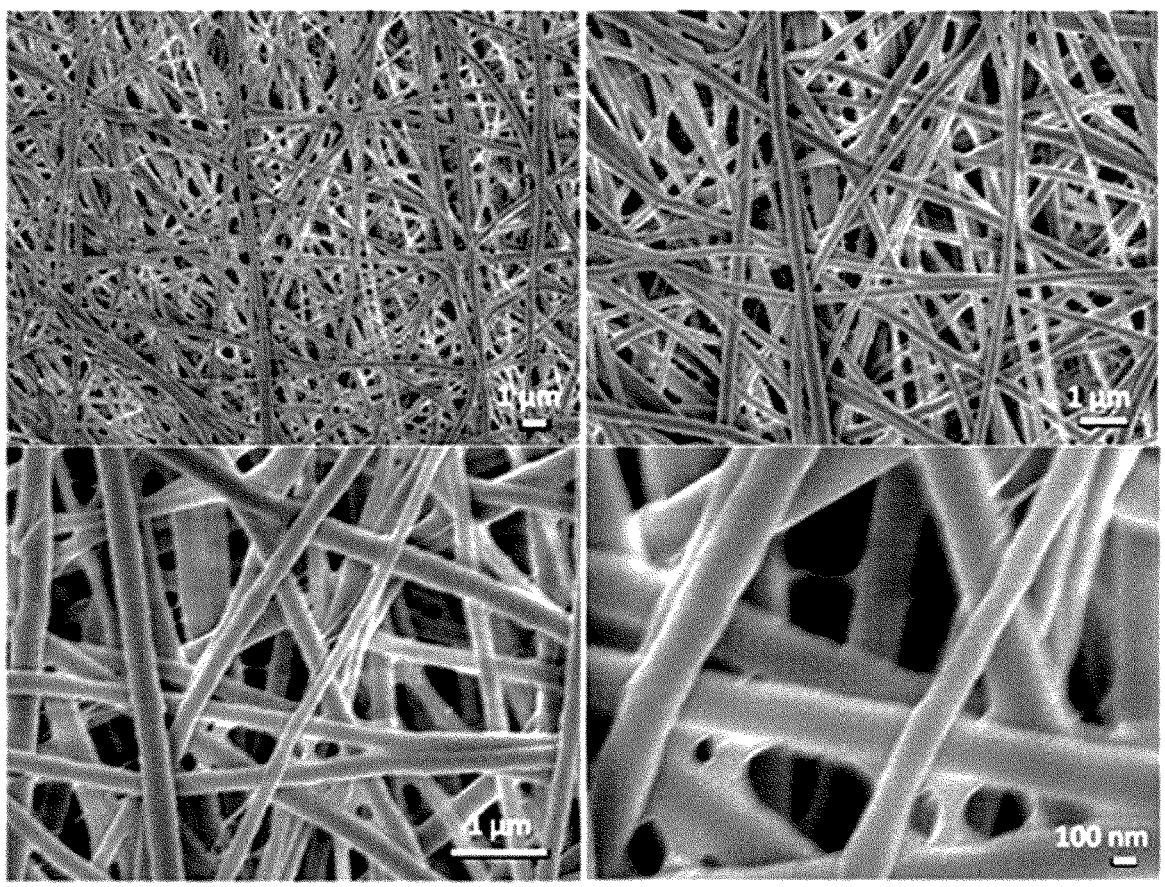
Figure 4B:
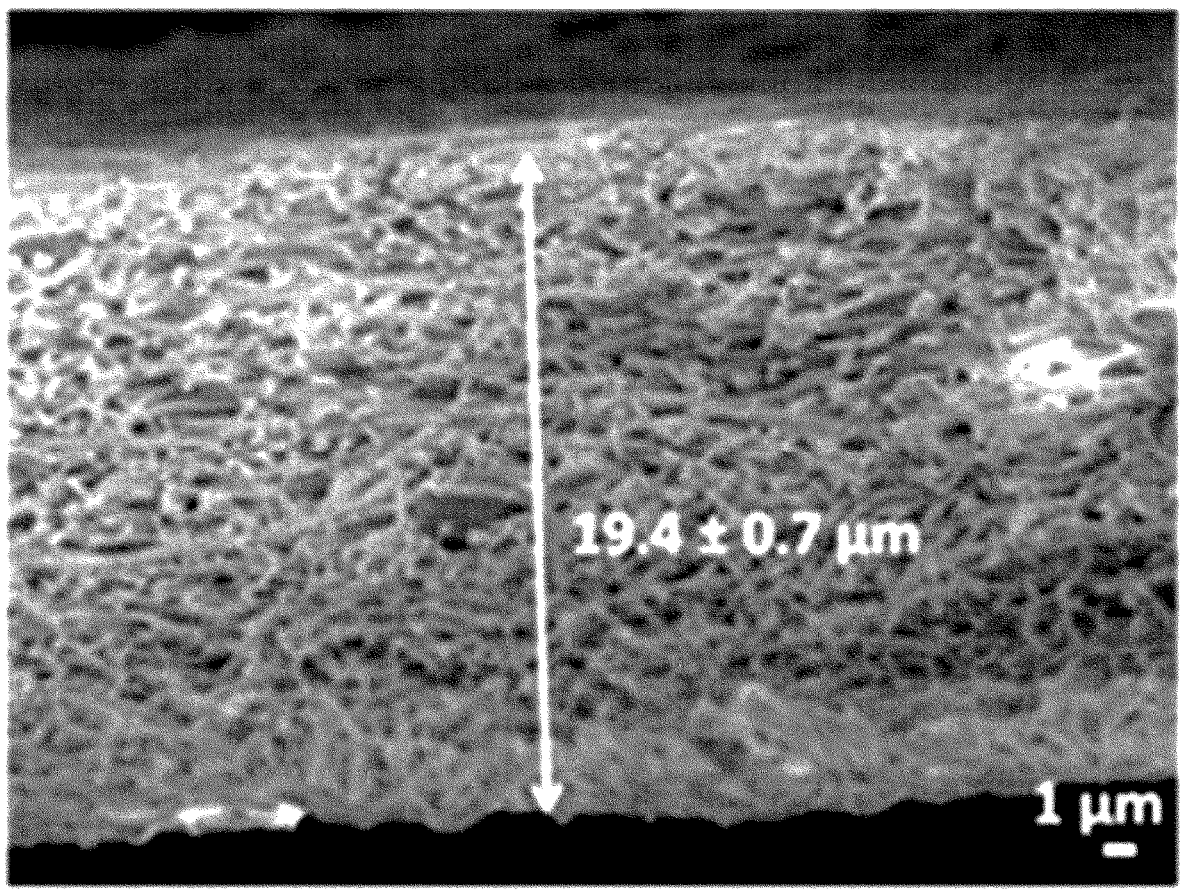

The nanofiber webs 111 and 112 perform filtration of water to be treated and may have a three-dimensional network structure in which the plurality of nanofibers 111a are randomly and three-dimensionally stacked (see FIGS. 4A and 4B).

The plurality of nanofibers 111a forming the nanofiber webs 111 and 112 may have diameters whose standard deviation is 300 nm or less, and preferably 200 nm or less. Thus, the pore size distribution of pores formed by the nanofibers may be very uniform, and selective removal efficiency and backwashing efficiency may be improved. When the standard deviation of the diameters of the plurality of nanofibers is greater than 300 nm, the diameters of the pores formed by the surrounded nanofibers become non-uniform, and thus the selective removal efficiency may be lowered and the backwashing efficiency may be lowered due to the non-uniform pore diameters.

Figure 2:
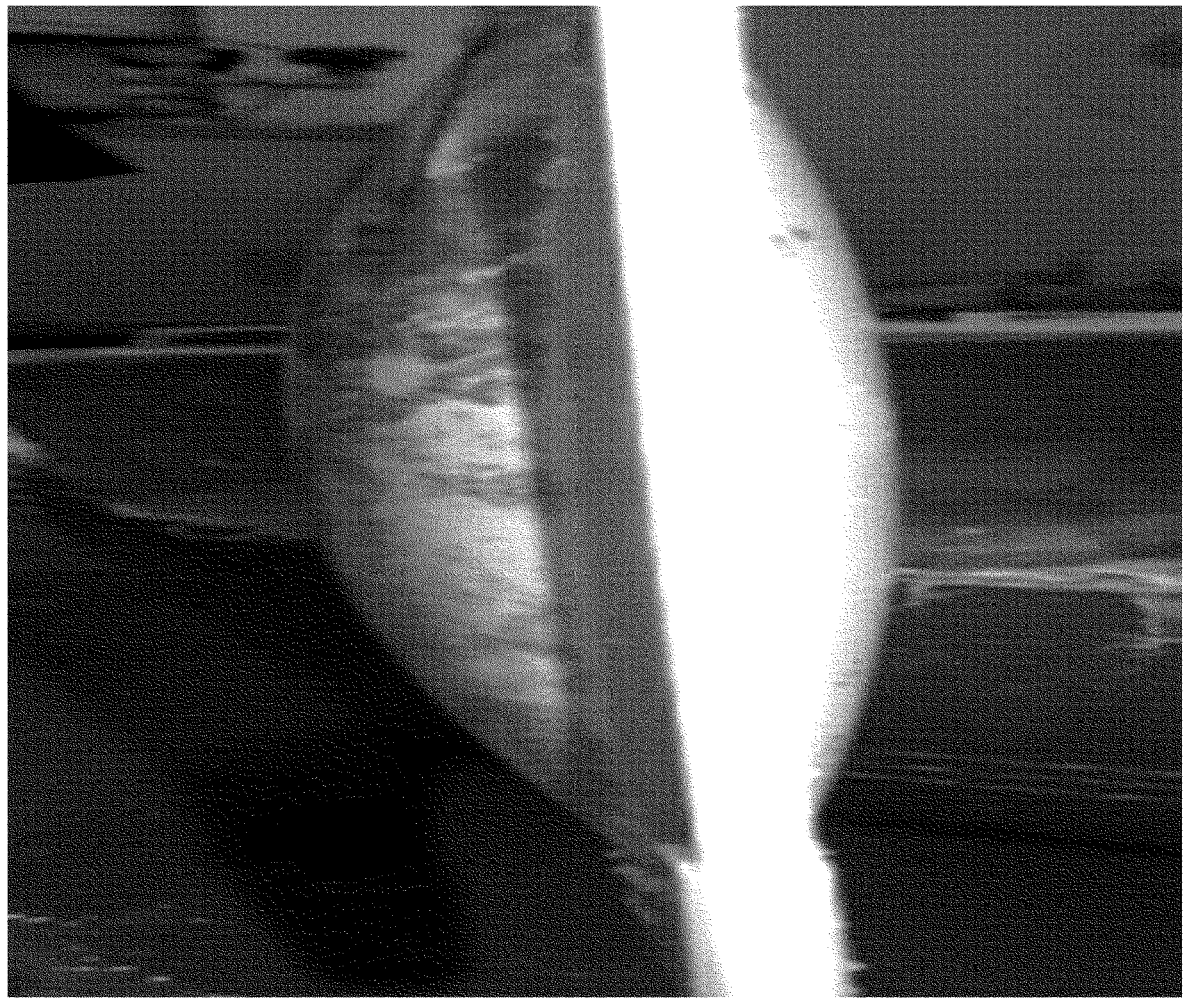
FIG. 2 is an image of a filter medium that swells due to a washing solution being trapped in the filter medium after being delaminated inside the filter medium in a backwashing process.

In addition, an average fiber diameter of the plurality of nanofibers 111a forming the nanofiber webs 111 and 112 may be in a range of 0.05 µm to 1 µm, and preferably 0.1 µm to 0.9 µm. When the average fiber diameter of the nanofiber is less than 0.05 µm, a flow rate may be reduced, smooth backwashing may be difficult because a phenomenon in which a separation membrane is swelled as illustrated in FIG. 2 may occur due to the increase of differential pressure, and a function as a separation membrane may be significantly degraded or completely lost. When the average fiber diameter is greater than 1 µm, a bonding force with the second support to be described later may be lowered, and filtration efficiency may be lowered.

Further, an average pore diameter of the nanofiber webs 111 and 112 may be in a range of 100 nm to 1000 nm, preferably 100 nm to 800 nm, and more preferably 100 nm to 500 nm. When the average pore diameter of the nanofiber web is less than 100 nm, the diameter of the nanofiber should also be very small to achieve the above-described condition, but it is very difficult to form a web to have pores with an average pore diameter of less than 100 nm by a spinning technique, and smooth backwashing may be difficult due to the increase of differential pressure. In addition, when the average pore diameter of the nanofiber web is greater than 1000 nm, the diameter of the nanofiber should be increased to achieve the above-described condition. When pores are formed by randomly and three-dimensionally stacking fibers having increased diameters, it is difficult to implement the pores having very narrow pore size distribution, and a web having a wide pore size distribution is likely formed. Accordingly, it is difficult to achieve the desired physical properties of the present invention, and thus filtration efficiency and backwashing durability may be lowered.

Meanwhile, since the nanofiber webs 111 and 112 are formed of the plurality of nanofibers 111a having very uniform diameters, the volume of pores having a pore diameter within an average pore diameter ±10% may be 60% or more of the total volume of the pores of the nanofiber web that has a predetermined average pore diameter in the above-described average pore diameter range and preferably 70% or more, and more preferably the volume of pores having a pore diameter within an average pore diameter ±5% may be 45% or more of the total volume of the pores of the nanofiber web, and even more preferably 50% or more. Thus, the selective separation efficiency and the backwashing efficiency of a target material may be further improved. Here, the increased volume of the pores having a pore diameter within an average pore diameter ±10% in the total volume of pores of the nanofiber web means that the pore diameters of the pores included in the nanofiber web are uniform to be close to the average pore diameter. Here, the volume of pores is a volume measured by a capillary flow porometer (CFP).

Further, the above-described nanofiber webs 111 and 112 may each formed to have a thickness of 0.5 µm to 200 µm, preferably 1 µm to 150 µm, and as an example, 20 µm. When the thickness of the nanofiber webs 111 and 112 is less than 0.5 µm, filtration efficiency and/or backwashing durability may be lowered, and when the thickness is greater than 200 µm, differential pressure may be increased to make smooth backwashing difficult.

In addition, the nanofiber webs 111 and 112 may each have a basis weight of 0.05 $g/m^2$ to 20 $g/m^2$, preferably 5 $g/m^2$ to 15 $g/m^2$, and as an example, 10 $g/m^2$. When the basis weight of the nanofiber webs is less than 0.05 $g/m^2$, filtration efficiency may be lowered, and a bonding force with the second support may be reduced to lower backwashing durability, and when the basis weight is greater than 20 $g/m^2$, it may be difficult to secure a desired level of flow rate, and differential pressure may be increased to make smooth backwashing difficult.

Further, the nanofiber webs 111 and 112 may each have a porosity of 40% to 90% and more preferably 60% to 90%.

The nanofibers 111a forming the nanofiber web may be made of a known fiber-forming component. However, the nanofiber may preferably include a fluorine-based compound as the fiber-forming component so as to exhibit more improved chemical resistance and heat resistance, and thus, there is an advantage in that, even when water to be treated is a strong acid/strong base solution or a high-temperature solution, filtration efficiency and flow rate may be secured to a desired level without changing physical properties of a filter medium, and the filter medium may have a long life cycle. The fluorine-based compound may be used without limitation as long as the fluorine-based compound is a known fluorine-based compound capable of being formed into a nanofiber. As an example, the fluorine-based compound may include at least one compound selected from the group consisting of polytetrafluoroethylene (PTFE)-based, tetrafluoroethylene-perfluoro alkyl vinyl ether (PFA) copolymer-based, tetrafluoroethylene-hexafluoropropylene (FEP) copolymer-based, tetrafluoroethylene-hexafluoropropylene-perfluoroalkyl vinyl ether (EPE) copolymer-based, tetrafluoroethylene-ethylene (ETFE) copolymer-based, polychlorotrifluoroethylene (PCTFE)-based, chlorotrifluoroethylene-ethylene (ECTFE) copolymer-based, and polyvinylidene fluoride (PVDF)-based compounds. More preferably, the fluorine-based compound may be PVDF in terms of a low production unit cost, ease of mass production of a nanofiber through electrospinning, and high mechanical strength and chemical resistance. Here, when the nanofiber includes PVDF as the fiber-forming component, a weight average molecular weight of the PVDF may be in a range of 10,000 to 1,000,000 and preferably in a range of 300,000 to 600,000, but the present invention is not limited thereto.

Meanwhile, the nanofibers forming the nanofiber webs 111 and 112 may be modified to increase hydrophilicity, and as an example, a hydrophilic coating layer may be further provided on at least a portion of an outer surface of the nanofiber. When the nanofiber includes a fluorine-based compound as described above, the fluorine-based compound may have very strong hydrophobicity such that a flow rate is not high when a filtrate to be filtered is a hydrophilic solution. To this end, a hydrophilic coating layer may be further provided on the surface of the nanofiber with hydrophobicity, and the hydrophilic coating layer may be a known one, and as an example, the hydrophilic coating layer may be formed to include a hydrophilic polymer including a hydroxyl group or may be formed by cross-linking the hydrophilic polymer using a crosslinking agent. As an example, the hydrophilic polymer may be in the form of one of polyvinyl alcohol (PVA), ethylenevinyl alcohol (EVOH), sodium alginate, and the like or a mixture thereof, and most preferably, may be PVA. In addition, the crosslinking agent may be used without limitation as long as the crosslinking agent is a known crosslinking agent including a functional group capable of being cross-linked with the hydroxyl group included in the hydrophilic polymer through a condensation reaction or the like. For example, the functional group may be a hydroxyl group, a carboxyl group, or the like.

In order to exhibit more improved physical properties, the hydrophilic coating layer may be formed by cross-linking PVA and a crosslinking agent including a carboxyl group. The PVA may have a degree of polymerization of 500 to 2,000 and a degree of saponification of 85% to 90%. When the degree of polymerization of the PVA is excessively low, the formation of the hydrophilic coating layer may not be smooth, and even though the hydrophilic coating layer is formed, the hydrophilic coating layer may be easily peeled off, and hydrophilicity may not be improved to a desired level. In addition, when the degree of polymerization is too high, the formation of the hydrophilic coating layer may be excessive, and thus, a pore structure of the nanofiber web may be changed, or pores may be clogged. In addition, when the degree of saponification is too low, it may be difficult to improve hydrophilicity.

The crosslinking agent may be a component including a carboxyl group so as to be cross-linked with the above-described PVA. As an example, the crosslinking agent may include at least one material selected from the group consisting of poly(acrylic acid-maleic acid), a polyacrylic acid, and poly(styrenesulfonic acid-maleic acid). In addition, the crosslinking agent may be a multifunctional crosslinking agent including at least three carboxyl groups so as to be coated very thinly for more improved coating and adhesive properties on hydrophobic surfaces of the nanofibers and for no change in a pore structure of the nanofiber webs 111 and 112, and so as to concurrently exhibit more improved flow rate. When the number of the carboxyl groups included in the crosslinking agent is less than 3, it is difficult for a coating layer to be formed on the hydrophobic surfaces of the nanofibers, and even though the coating layer is formed, an adhesion force may be very weak and thus the coating layer may be easily peeled off. As an example, the crosslinking agent including at least three carboxyl groups may be poly(acrylic acid-maleic acid).

The hydrophilic coating layer may be formed by cross-linking 2 to 20 parts by weight of a crosslinking agent including a carboxyl group with respect to 100 parts by weight of the above-described PVA. When the crosslinking agent is included in an amount less than 2 parts by weight, the formability of the hydrophilic coating layer may be lowered, and chemical resistance and mechanical strength may be lowered. In addition, when the crosslinking agent is included in an amount exceeding 20 parts by weight, a flow rate may be reduced because pores are decreased due to the coating layer.

Meanwhile, the hydrophilic coating layer may be partially or entirely formed on the outer surface of the nanofiber. Here, the nanofiber may be coated with the hydrophilic coating layer such that the hydrophilic coating layer is included in an amount of 0.1 g to 2 g per unit area ($m^2$) of the nanofiber web.

As described above, a wetting angle may be less than or equal to 30°, more preferably less than or equal to 20°, still more preferably less than or equal to 12°, and yet more preferably less than or equal to 5° on a surface of each of the nanofiber webs 111 and 112 modified so as to include the hydrophilic coating layer, and as a result, an improved flow rate may be secured even though the fiber webs are implemented using the nanofiber, that is, a hydrophobic material.

Meanwhile, the nanofiber webs 111 and 112 may be provided as one or more layers in the filter medium 1000, and in this case, the nanofiber webs may differ in porosity, pore diameter, basis weight, and/or thickness.

Next, the first support 130 will be described.

The first support 130 supports the filter medium 1000, forms a large flow path, and thus serves a function of more smoothly performing a filtration process or a backwashing process. Specifically, during the filtration process, when a pressure gradient is formed such that pressure inside the filter medium is lower than pressure outside the filter medium, the filter medium may be pressed, and in this case, a flow path, through which a filtrate flows in the filter medium, may be considerably decreased or blocked, and thus, greater differential pressure may be applied to the filter medium and simultaneously a flow rate may be considerably reduced. In addition, during the backwashing process, an external force for expanding the filter medium from an inner side to both outer sides of the filter medium may be applied, and when mechanical strength of the filter medium is low, the filter medium may be damaged due to the applied external force.

The first support 130 may be provided to prevent such problems occurring during the filtration process and/or backwashing process, may be used in a water treatment field, and may include a known porous member of which mechanical strength is secured, and as an example, the first support may include a non-woven fabric, a fabric, or a textile.

The term "fabric" means that a fiber included in the fabric has longitudinal and transverse directionalities. A specific structure of the fabric may be a plain weave, a twill weave, or the like, and density of warp yarn and weft yarn is not particularly limited. In addition, the knitted fabric may have a known knit structure and may be a weft-knitted fabric, a warp-knitted fabric, or the like, and as an example, the knitted fabric may be a tricot in which yarn is warp knitted. Further, as shown in FIG. 1, the first support 130 may include a non-woven fabric in which a first composite fiber 130a has no longitudinal or transverse directionality or may use a known non-woven fabric manufactured through various methods, such as a dry non-woven fabric such as a chemical bonding non-woven fabric, a thermally bonded non-woven fabric, and an airlaid non-woven fabric, a wet non-woven fabric, a spunlace non-woven fabric, a needle punching non-woven fabric, or a melt-blown non-woven fabric.

In order to exhibit sufficient mechanical strength, the first support 130 may have a thickness of 2 mm to 8 mm, more preferably 2 mm to 5 mm, and even more preferably 3 mm to 5 mm. When the thickness is less than 2 mm, the first support 130 may not exhibit sufficient mechanical strength capable of withstanding frequent backwashing. In addition, when the thickness is greater than 8 mm and when the filter medium is implemented as a filter unit to be described below and then a plurality of filter units are implemented as a filter module having a limited space, a degree of integration of the filter medium per unit volume of the module may be reduced, and differential pressure may be increased to make smooth backwashing difficult.

Further, the first support 130 may have a basis weight of 250 g/m$^2$ to 800 g/m$^2$, and more preferably 350 g/m$^2$ to 600 g/m$^2$. When the basis weight is less than 250 g/m$^2$, it may be difficult to exhibit sufficient mechanical strength, and an adhesion force with the second support may be reduced, and when the basis weight is greater than 800 g/m$^2$, a sufficient flow path may not be formed to reduce a flow rate, and differential pressure may be increased to make smooth backwashing difficult.

Further, when the first support 130 is formed of a fiber such as a non-woven fabric, an average diameter of the fiber may be in a range of 5 μm to 50 μm and preferably 20 μm to 50 μm. When the average fiber diameter of the first support 130 is less than 5 μm, a flow rate may be reduced, and differential pressure may be increased to make smooth backwashing difficult, and when the average fiber diameter is greater than 50 μm, it may be difficult to exhibit sufficient mechanical strength, filtration efficiency may be lowered, and an adhesion force with the second support may be reduced.

In addition, the first support 130 may have an average pore diameter of 20 μm to 200 μm and a porosity of 50% to 90%, but the present invention is not limited thereto, and there are no restrictions on porosity and pore diameter size as long as the first support 130 has porosity and a pore diameter size sufficient to support the nanofiber webs 111 and 112 to exhibit a desired level of mechanical strength and simultaneously to smoothly form a flow path even at high pressure in the filtration process and/or backwashing process.

A material of the first support 130 is not limited as long as the material may be generally used as a support of a separation membrane. As a non-limiting example thereof, a synthetic polymer component selected from the group consisting of polyester-based, polyurethane-based, polyolefin-based, and polyamide-based polymer components, or a natural polymer component including a cellulose-based polymer component may be used. However, when the first support has strong brittleness, it may be difficult to provide a desired level of bonding force in a process of laminating the first support with the second support, and this is because the first support does not have a smooth surface like a film and may have an uneven surface having porosity, and the surface formed by fibers such as a non-woven fabric may have an unsmooth surface depending on an arrangement of fibers, fineness of fibers, and the like, and a degree thereof may be different according to positions. In a state in which portions are present that are not in close contact with an interface between two layers to be laminated, when the remaining portions are bonded, delamination may start due to the portions that are not in close contact with the interface. In order to address this problem, it is necessary to perform a lamination process in a state in which an adhesion degree of the two layers is increased by applying pressure in both directions of the two layers. However, in the case of a support having very brittle physical properties, even when a pressure is applied, there may be a limitation in increasing adhesion of the interface between the two layers, and when higher pressure is applied, the support may be damaged. Accordingly, a material having high flexibility and elongation may be suitable as a material of the first support, and preferably, the first support 130 may include a polyolefin-based material so as to have high adhesion with the second supports 121 and 122.

Meanwhile, the first support 130 may include a low melting point component so as to be bonded with the second supports 121 and 122 without a separate adhesive or adhesive layer. When the first support 130 includes a fabric such as a non-woven fabric, the first support 130 may be made of the first composite fiber 130a including a low melting point component. The first composite fiber 130a may include a support component and a low melting point component and may be disposed such that at least a portion of the low melting point component is exposed at an outer surface thereof. As an example, the first composite fiber 130a may be a sheath-core type composite fiber in which a support component forms a core portion and a low melting point component forms a sheath portion surrounding the core portion, or a side-by-side composite fiber in which a low melting point component is disposed on one side of a support component. The low melting point component and the support component may be polyolefin-based components in terms of flexibility and elongation of the support as described above, and as an example, the support component may be polypropylene, and the low melting point component may be polyethylene. The low melting point component may have a melting point of 60° C. to 180° C.

Next, the second supports 121 and 122, which are interposed between the first support 130 and the nanofiber webs 111 and 112 described above, will be described.

The second supports 121 and 122 support the nanofiber webs 111 and 112 and serve a function of increasing adhesion of each layer provided in the filter medium.

The first support 130 performs a function of supplementing the mechanical strength so that the function of the filter medium may be fully ensured even in the backwashing process performed at very high pressure as described above. However, even when the first support 130 itself has very high mechanical strength, when the bonding force between the first support 130 and the nanofiber webs 111 and 112 is weakened, the washing solution introduced into the first support during the backwashing process may not escape to the outside of the nanofiber web and may be trapped inside the filter medium such that the filter medium swells as shown in FIG. 2 such as to significantly reduce the backwashing efficiency, and interface separation between the first support and the nanofiber web may be accelerated, causing the function of the filter medium to be degraded or lost. In particular, in order to retain sufficient mechanical strength without disturbing the flow of the filtrate that has passed through the nanofiber web, the thickness needs to be increased while maintaining an appropriate basis weight, and when a non-woven fabric with a great thickness and a nanofiber web with a small thickness are laminated by applying heat/pressure, the nanofiber web functioning as a filter medium may be physically and chemically deformed by the applied heat/pressure due to the difference in material melting point, heat capacity, or the like between the non-woven fabric and the nanofiber web, and changes in initially designed physical properties such as the flow rate, filtration rate, and the like of the filter medium may be caused.

Accordingly, in the filter medium 1000 according to one embodiment of the present invention, the first support 130 and the nanofiber webs 111 and 112 may not be in direct contact with each other, and the second supports 121 and 122, which are thinner than the first support 130, may be further interposed between the first support 130 and the nanofiber webs 111 and 112, and through this, the interlayer bonding process may be performed more stably and easily, a significantly high binding force may be exhibited at an interface between the layers, and interlayer delamination and peeling-off problems may be minimized even when high external force is applied due to the backwashing or the like.

Figure 3:
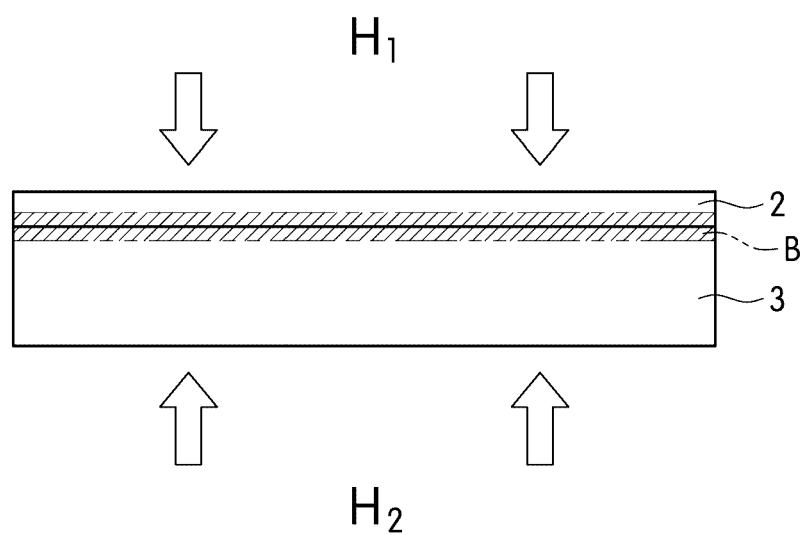
FIG. 3 is a schematic view illustrating lamination of the filter medium according to one embodiment of the present invention, and a view illustrating lamination between a nanofiber web and a second support.

When this is described with reference to FIG. 3, since the difference in thickness between a second support 3 and a nanofiber web 2 is remarkably reduced in the filter medium, heat H1 and H2 applied from above and below the laminate of the nanofiber web 2/the second support 3 reaches the interface therebetween to facilitate the formation of a fusion portion B. In addition, since it is easier to control the amount and time of applied heat as compared with the case in which the second support is not present, it is advantageous to prevent physical/chemical deformation of the nanofiber web 2. Accordingly, as shown in FIG. 3, when the nanofiber web 2 is bonded to the second support 3, nanofibers may be bonded to the support through a high adhesion force without a change in initially designed physical properties of the nanofiber web 2.

Although the second supports 121 and 122 are not particularly limited as long as the second supports 121 and 122 generally serve as a support of the filter medium, the shape of the second supports 121 and 122 may be a shape of a fabric, a knitted fabric, or a non-woven fabric. The fabric means that a fiber included in the fabric has longitudinal and transverse directionalities. A specific structure of the fabric may be a plain weave, a twill weave, or the like, and density of warp yarn and weft yarn is not particularly limited. In addition, the knitted fabric may have a known knit structure and may be a weft-knitted fabric, a warp-knitted fabric, or the like, but the present invention is not particularly limited thereto. In addition, the non-woven fabric means that a fiber included in the non-woven fabric has no longitudinal or transverse directionality. The non-woven fabric may be a non-woven fabric manufactured through a known method, such as a dry non-woven fabric such as a chemical bonding non-woven fabric, a thermally bonded non-woven fabric, and an airlaid non-woven fabric, a wet non-woven fabric, a spunlace non-woven fabric, a needle punching non-woven fabric, or a meltblown non-woven fabric.

The second supports 121 and 122 may each include, for example, a non-woven fabric, and here, fibers forming the second supports 121 and 122 may have an average diameter of 5 μm to 30 μm, and preferably, 10 μm to 25 μm. When the average fiber diameter of the second supports 121 and 122 is less than 5 μm, a flow rate may be reduced, and differential pressure may be increased to make smooth backwashing difficult. When the average fiber diameter is greater than 30 μm, filtration efficiency may be lowered, and an adhesion force with the first support and the nanofiber web may be reduced.

Further, the second supports 121 and 122 may each have a thickness of 150 μm to 250 μm, preferably, 160 to 240 μm, and as an example, 200 μm. When the thickness of each of the second supports 121 and 122 is less than 150 μm, filtration efficiency and backwashing durability may be lowered, and when the thickness is greater than 250 μm, differential pressure may be increased to make smooth backwashing difficult.

Further, the second supports 121 and 122 may each have an average pore diameter of 20 μm to 100 μm and a porosity of 50% to 90%. However, the present invention is not limited thereto, and there are no restrictions in porosity and pore diameter size as long as the second supports 121 and 122 have a degree of the porosity and a pore diameter size so as to support the nanofiber webs 111 and 112 to exhibit a desired level of mechanical strength and simultaneously so as not to inhibit a flow of a filtrate introduced through the nanofiber webs 111 and 112.

Further, the second supports 121 and 122 may each have a basis weight of 35 g/m$^2$ to 80 g/m$^2$, more preferably 40 g/m$^2$ to 75 g/m$^2$, and as an example, 40 g/m$^2$. When the basis weight is less than 35 g/m$^2$, filtration efficiency may be lowered and an amount of fibers forming the second supports, which are distributed at interfaces formed between the second supports and the nanofiber webs 111 and 112, may be small. Accordingly, an effective adhesion area of the second support in contact with the nanofiber web may be reduced and thus a desired level of binding force may not be achieved. In addition, it may not be possible to exhibit sufficient mechanical strength capable of supporting the nanofiber web, and an adhesion force with the first support may be reduced. In addition, when the basis weight is greater than 80 g/m$^2$, it may be difficult to secure a desired level of flow rate, and differential pressure may be increased to make smooth backwashing difficult.

A material of each of the second supports 121 and 122 is not limited as long as the material is used as a support of a filter medium. As a non-limiting example thereof, a synthetic polymer component selected from the group consisting of polyester-based, polyurethane-based, polyolefin-based, and polyamide-based polymer components, or a natural polymer component including a cellulose-based polymer component may be used.

However, the second supports 121 and 122 may include a polyolefin-based polymer component so as to improve adhesion with the nanofiber webs 111 and 112 and the first support 130 described above. In addition, when the second supports 121 and 122 include a fabric such as a non-woven fabric, the second supports 121 and 122 may be made of a second composite fiber 121a including a low melting point component. The second composite fiber 121a may include a support component and a low melting point component and may be disposed such that at least a portion of the low melting point component is exposed at an outer surface thereof. As an example, the second composite fiber 120a may be a sheath-core type composite fiber in which a support component forms a core portion and a low melting point component forms a sheath portion surrounding the core portion, or a side-by-side composite fiber in which a low melting point component is disposed on one side of a support component. The low melting point component and the support component may be polyolefin-based components in terms of flexibility and elongation of the support as described above, and as an example, the support component may be polypropylene, and the low melting point component may be polyethylene. The low melting point component may have a melting point of 60° C. to 180° C.

The low melting point component of the second composite fiber 121a may be melted by heat/pressure applied in the lamination process to form the fusion portion B with the nanofiber webs 111 and 112 and, and as a result, a strong binding force may be exhibited.

When the above-described first support 130 is implemented using the first composite fiber 130a including the low melting point component so as to exhibit a further improved binding force with the second supports 121 and 122, the low melting point component of the first composite fiber 130a and the low melting point component of the second composite fiber 121a may be fused at the interface between the first support 130 and the second support 121 to form a stronger fusion portion. Here, the first composite fiber 130a and the second composite fiber 121a may be made of the same material in terms of compatibility.

Meanwhile, a filter medium 1000 according to another embodiment of the present invention, as shown in FIG. 1, includes: a porous first support 130; nanofiber webs 111 and 112 stacked above and below the first support, respectively; and porous second supports 121 and 122 interposed between the first support and the nanofiber webs.

Here, the same description as the description of the filter medium according to one embodiment of the present invention described above will be omitted.

In general, in a filter medium, as a water treatment process is repeatedly performed, foreign substances, which are included in water to be treated, adhere to the filter medium and form an adhesive layer or are stuck to an inside of the filter medium to block a flow path and degrade a filtration function, and when the filter medium is replaced whenever such problems occur, costs required for water treatment increase. Accordingly, in order to extend a use period of a filter medium, it is necessary to perform a washing process of periodically applying a physical stimulus to the filter medium to remove foreign substances attached to or stuck in the filter medium, which is called backwashing. Typically, in the backwashing, the foreign substances attached to or stuck in the filter medium are removed by allowing washing water to strongly flow or blowing air in a direction opposite to a filtering direction of the filter medium, and in order to supply the washing water or air to the filter medium and simultaneously remove the foreign substances, it is necessary to supply the washing water or air at a pressure higher than pressure applied to the filter medium in a filtration process.

However, a filtration medium in which nanoscale ultra-fine fibers are implemented in the form of a nanofiber web has a lower mechanical strength than a filter medium implemented in the form of general non-woven fabrics and thus is more likely to cause damage to the nanofiber webs during water treatment operations. In particular, the nanofibers may not withstand the high pressure caused by the above-described backwashing and thus may be broken or partially deformed. Accordingly, the mechanical strength of the nanofiber web may be further lowered, and as a result, the stability and durability of the filter medium may not be guaranteed.

Accordingly, the filter medium according to the present invention includes the nanofiber webs 111 and 112 having tensile strength satisfying a predetermined level. Accordingly, a filter medium is implemented that prevents the degradation of the mechanical strength of the nanofiber webs 111 and 112 due to the breakage or deformation of the nanofibers even in a backwashing process performed at higher pressure as well as during a water treatment operation.

To this end, the nanofiber webs 111 and 112 provided in the filter medium 1000 according to the present invention are implemented such that the tensile strength in a mechanical direction (MD direction) is greater than the tensile strength in a transverse direction (TD direction). The tensile strength in the MD direction refers to the tensile strength of the nanofiber web with respect to a direction in which the nanofiber is spun and discharges, and the tensile strength in the TD direction refers to the tensile strength in a transverse direction of the MD direction, that is, a direction perpendicular to the direction in which the nanofiber is spun and discharges. In addition, the tensile strength of the nanofiber web refers to the maximum strain that the nanofiber web may withstand without being broken due to the tensile force when the tensile force in the MD or TD direction is applied on the nanofiber web.

Here, the tensile strength in the TD direction and the tensile strength in the MD direction do not act as independent factors determining the mechanical strength of the nanofiber web and may influence each other during the water treatment operation on the filtration media. For example, the nanofiber web according to the present invention includes pores formed by crossing a plurality of strands of nanofibers to generate a concentrated stress phenomenon, in which local stress is applied around the pores, due to the tensile force in the TD direction or the MD direction. In addition, strain due to the concentrated stress may also be changed because the pores formed by the plurality of strands of nanofibers have different pore sizes. Furthermore, the nanofiber having high mechanical strength may be realized by concurrently controlling the tensile strengths in the TD direction and the MD direction because a filtrate to be filtered is not filtered only in a constant direction of a transverse direction or a longitudinal direction.

Further, in a fiber web formed through the electrospinning, generally, fibers do not have directionalities, and thus the tensile strength in the TD direction and the tensile strength in the MD direction have the same value. In this case, the fiber web may be easily damaged by a pressure greater than the tensile strength in the MD direction and the tensile strength in the TD direction during backwashing in which high-pressure washing water is filtered in a direction opposite a direction in which the filtrate to be filtered is filtered. In particular, when a fiber web is formed by using nanoscale ultra-fine fibers, it is difficult to expect tensile strength to be increased by the entanglement between microfibers, and thus additional support members or additional processes are required to compensate for the mechanical strength of the fiber web at high pressure resulting from the filtration process and backwashing.

However, since the nanofiber webs 111 and 112 according to the present invention are implemented such that the tensile strength in the MD direction has a value greater than that of the tensile strength in the TD direction, it is possible to prevent the degradation of physical properties due to the mechanical strength of the nanofiber webs 111 and 112 even in the backwashing process of filtering the high-pressure washing water. More specifically, in the nanofiber webs 111 and 112 according to the present invention, nanofibers in the MD direction, which are formed in a radial direction in a manufacturing process to be described below, are granted linearity and thus have more entanglement generated therein in comparison with nanofibers in the TD direction, which have no directionality. Accordingly, the tensile strength in the MD direction may have a greater value compared to the tensile strength in the TD direction, and in this case, even when a pressure greater than the tensile strength of the nanofiber in the TD direction is applied to the nanofiber webs 111 and 112, mechanical denaturation is not induced in the nanofiber webs 111 and 112 unless a backwashing pressure greater than the tensile strength in the MD direction is applied. That is, the concentrated stress that is a phenomenon described above may be dispersed in the TD direction and the MD direction so that the deformation due to the degradation of the mechanical strength of the nanofiber webs 111 and 112 may be minimized.

Further, according to one embodiment of the present invention, a tensile strength ratio between the tensile strength in the TD direction and the tensile strength in the MD direction of the nanofiber webs 111 and 112 may be in a range of 1:1.2 to 6.5, and preferably 1.5 to 5.0. When the tensile strength ratio between the tensile strength in the TD direction and the tensile strength in the MD direction of the nanofiber webs 111 and 112 is less than 1:1.2, the nanofiber web may not withstand pressure during the backwashing and may be bent or the nanofiber that forms the nanofiber web may be broken, and as a result, the durability and stability of the filtration medium may be degraded. When the tensile strength ratio is greater than 1:6.5, the tensile strength in the TD direction is too weak compared to the tensile strength in the MD direction, and thus when the filtrate to be filtered is treated in the TD direction, damage or breakage of the nanofibers arranged in the TD direction may occur, thereby causing mechanical deformation of the nanofiber web.

Further, the tensile strength of the nanofiber webs 111 and 112 in the MD direction may be in a range of 0.8 kg/mm$^2$ to 7.0 kg/mm$^2$, and preferably 1 kg/mm$^2$ to 6.5 kg/mm$^2$. In addition, the tensile strength in the TD direction may be in a range of 0.3 kg/mm$^2$ to 5.0 kg/mm$^2$, and preferably 0.5 kg/mm$^2$ to 4 kg/mm$^2$. When the tensile strength in the MD direction is less than 0.8 kg/mm$^2$, or the tensile strength in the TD direction is less than 0.3 kg/mm$^2$, the mechanical strength according to the tensile strength of the nanofiber web is weak and thus deformation may be easily generated by an external tensile force. In addition, when the tensile strength in the MD direction is greater than 7 kg/mm$^2$, or the tensile strength in the TD direction is greater than 5 kg/mm$^2$, the backwashing durability may be degraded as the flexibility of the nanofiber web is lowered.

Meanwhile, the tensile strengths of the nanofiber webs 111 and 112 forming the filtration media are influenced by various factors such as the basis weight of the nanofiber web, the diameter and the fineness of the nanofiber, the porosity and the size of pores formed by the intersection of nanofibers, and the like, and thus have a deviation in specific portions of the nanofiber webs 111 and 112. Since the deviation of the tensile strength may affect the durability and mechanical strength of the nanofiber web, it is preferable to minimize the deviation in the specific portions of the nanofiber webs 111 and 112.

Accordingly, the nanofiber webs 111 and 112 according to one embodiment of the present invention may have a value of each of Equation 1 and Equation 2 of 0.1 or less, and preferably 0.05 or less.

(Standard deviation of tensile strength in MD direction)/(average tensile strength in MD direction)  [Equation 1]

(Standard deviation of tensile strength in TD direction)/(average tensile strength in TD direction).  [Equation 2]

Here, the average tensile strength in the MD direction refers to a value obtained by measuring and averaging the tensile strength of the central portion of each of first to tenth regions formed by dividing the nanofiber webs 111 and 112 into ten equal portions to be parallel to a radial direction, and the average tensile strength in the TD direction refers to a value obtained by measuring and averaging the tensile strength of the central portion of each of first to tenth regions formed by dividing the nanofiber webs 111 and 112 into ten equal portions to be parallel to a direction perpendicular to the radial direction.

Further, the standard deviation of the tensile strength in the MD direction refers to a value calculated by applying the square root to a "variance" obtained by summing and averaging a squared value of each "deviation" obtained by subtracting the value of the above-described average tensile strength in the MD direction from the value of the tensile strength of the central portion of each of the first to tenth regions in the MD direction, and the standard deviation of the tensile strength in the TD direction refers to a value calculated by applying the square root to a "variance" obtained by summing and averaging a squared value of each "deviation" obtained by subtracting the value of the above-described average tensile strength in the TD direction from the value of the tensile strength of the central portion of each of the first to tenth regions in the TD direction.

Specifically, the standard deviation and the average tensile strength of the tensile strength in the MD direction are measured after preparing specimens each having a size of 25 mm×150 mm (width×length) by dividing a nanofiber web having a size of 250 mm×150 mm (width×length) into ten equal portions in the MD direction, and the standard deviation and the average tensile strength of the tensile strength in the TD direction are measured after preparing specimens each having a size of 150 mm×25 mm (width×length) by dividing a nanofiber web having a size of 150 mm×250 mm (width×length) into ten equal portions in the TD direction.

When the value of each of Equation 1 and Equation 2 is greater than 0.1, because the tensile strength values of the specific portions of the nanofiber webs 111 and 112 are non-uniform, the mechanical strength and durability of the nanofiber webs 111 and 112 may not be secured, and thus the reliability of the filtration efficiency of the manufactured filter medium may be lowered.

The above-described filter medium 1000 may be manufactured through a manufacturing method to be described below, but the present invention is not limited thereto.

The filter medium 1000 according to the present invention may be manufactured through operations including: (1) manufacturing a laminate including a nanofiber web formed on one surface of a second support by discharging a spinning solution including a fiber-forming component to one surface of the second support using a spinning nozzle while applying air in the same direction as a spinning direction of the spinning nozzle in the vicinity of an outer circumference of the spinning nozzle; and (2) laminating by placing the laminate such that the second support is in contact with each of the upper and lower surfaces of the first support.

First, as operation (1) according to the present invention, an operation is performed of manufacturing the laminate including the nanofiber web formed on one surface of the second support by discharging the spinning solution including the fiber-forming component to one surface of the second support using the spinning nozzle while applying air in the same direction as the spinning direction of the spinning nozzle in the vicinity of the outer circumference of the spinning nozzle.

In the case of the nanofiber web, a method of providing a nanofiber to form a fiber web having a three-dimensional network shape may be used without limitation. As an example, since the spinning may be electrospinning, hereinafter, operation (1) will be described in detail as an example of performing the operation using electrospinning.

The nanofiber web may be formed by electrospinning a spinning solution including a fluorine-based compound on the second support.

As an example, the spinning solution may include a fluorine-based compound as a fiber-forming component and a solvent. The fluorine-based compound may be included in an amount of 5 wt % to 30 wt % and preferably in an amount of 8 wt % to 20 wt % in the spinning solution. When the fluorine-based compound is included in an amount less than 5 wt %, it may be difficult for the spinning solution to be formed into a fiber, and the spinning solution may not be spun into a fibrous phase and may be spun in a droplet state to form a film phase, or even though spinning is performed, many beads may be formed and a solvent may not be volatized easily. Thus, pores may be clogged in a calendering process to be described below. In addition, when the fluorine-based compound is included in an amount exceeding 30 wt %, viscosity is increased to cause solidification on a surface of a solution, and thus, it may be difficult to perform spinning for a long time. In addition, a fiber diameter may be increased, and thus, a fibrous phase with a sub-micrometer size or less may not be formed.

The solvent may be used without limitation as long as the solvent does not form a precipitate while dissolving the fiber-forming component, i.e., the fluorine-based compound, and does not affect spinnability of a nanofiber to be described below. Preferably, the solvent may include at least one selected from the group consisting of γ-butyrolactone, cyclohexanone, 3-hexanone, 3-heptanone, 3-octanone, N-methylpyrrolidone, dimethylacetamide, acetone, dimethyl sulfoxide, and dimethylformamide. As an example, the solvent may be a mixed solvent of dimethylacetamide and acetone.

The manufactured spinning solution may be manufactured into a nanofiber through well-known electrospinning devices and methods. As an example, the electrospinning device may be an electrospinning device including a single spin pack with one spin nozzle or may be an electrospinning device including a plurality of single spin packs or a spin pack with a plurality of nozzles for mass production. In addition, in the electrospinning method, dry spinning or wet spinning with an external coagulation bath may be used, and the method is not limited.

When a stirred spinning solution is introduced into the electrospinning device, and is electrospun on a collector, for example, a nanofiber web formed of a nanofiber paper may be obtained. As a specific condition for the electrospinning, for example, air pressure of air sprayed through an air spray nozzle provided in a nozzle of a spin pack may be set to be in a range of 0.01 MPa to 0.2 MPa. When the air pressure is less than 0.01 MPa, the air pressure may not contribute to collection and accumulation of the nanofiber. When the air pressure is greater than 0.2 MPa, a cone of the spin nozzle is hardened such as to generate blocking of needles, thereby resulting in spinning problems. In addition, when the spinning solution is spun, an injection rate of the spinning solution per nozzle may be in a range of 10 μl/min to 30 μl/min. In addition, a distance between a tip of the nozzle and the collector may be in a range of 10 cm to 30 cm. However, the present invention is not limited thereto, and the injection rate and the distance may be changed according to a purpose.

Alternatively, a nanofiber may be directly electrospun on the above-described second support to directly form a nanofiber web on the second support. The nanofiber accumulated/collected on the second support may have a three-dimensional network structure. Heat and/or pressure are further applied to the accumulated/collected nanofiber so as to have a porosity, a pore size, and basis weight suitable for exhibiting desired water permeability and filtration efficiency of a separation membrane, thereby implementing the nanofiber into a nanofiber web having a three-dimensional network structure. A known method may be adopted as a specific method of applying the heat and/or pressure, and as a non-limiting example thereof, a common calendering process may be used. In this case, the applied heat may have a temperature of 70° C. to 190° C. In addition, when the calendering process is performed, the calendering process may be performed multiple times. For example, a drying process for partially or entirely removing a solvent and moisture, which remain in the nanofiber through primary calendering, may be performed, and then, secondary calendering may be performed to control porosity and improve strength. Here, a degree of heat and/or pressure applied in each calendering process may be the same or different.

Meanwhile, when the second support is implemented using a low melting point composite fiber, bonding between the nanofiber web and the second support through thermal fusion may be concurrently performed through the calendering process.

Further, a separate hot-melt powder or hot melt web may be further interposed to bond the second support and the nanofiber web. Here, a temperature of the applied heat may be in a range of 60° C. to 190° C., and the pressure may be applied in a range of 0.1 kgf/cm$^2$ to 10 kgf/cm$^2$, but the present invention is not limited thereto. However, components such as the hot-melt powder separately added for the bonding may form a fume or may be melted in a process of laminating the supports or the support and the nanofiber, and thus, pores may be frequently clogged. Accordingly, an initially designed flow rate of a filter medium may not be achieved. In addition, the components may be dissolved in a water treatment process such as to cause negative environmental problems so that it is preferable that the second support and the nanofiber web are bonded without adding the components.

Figure 5:
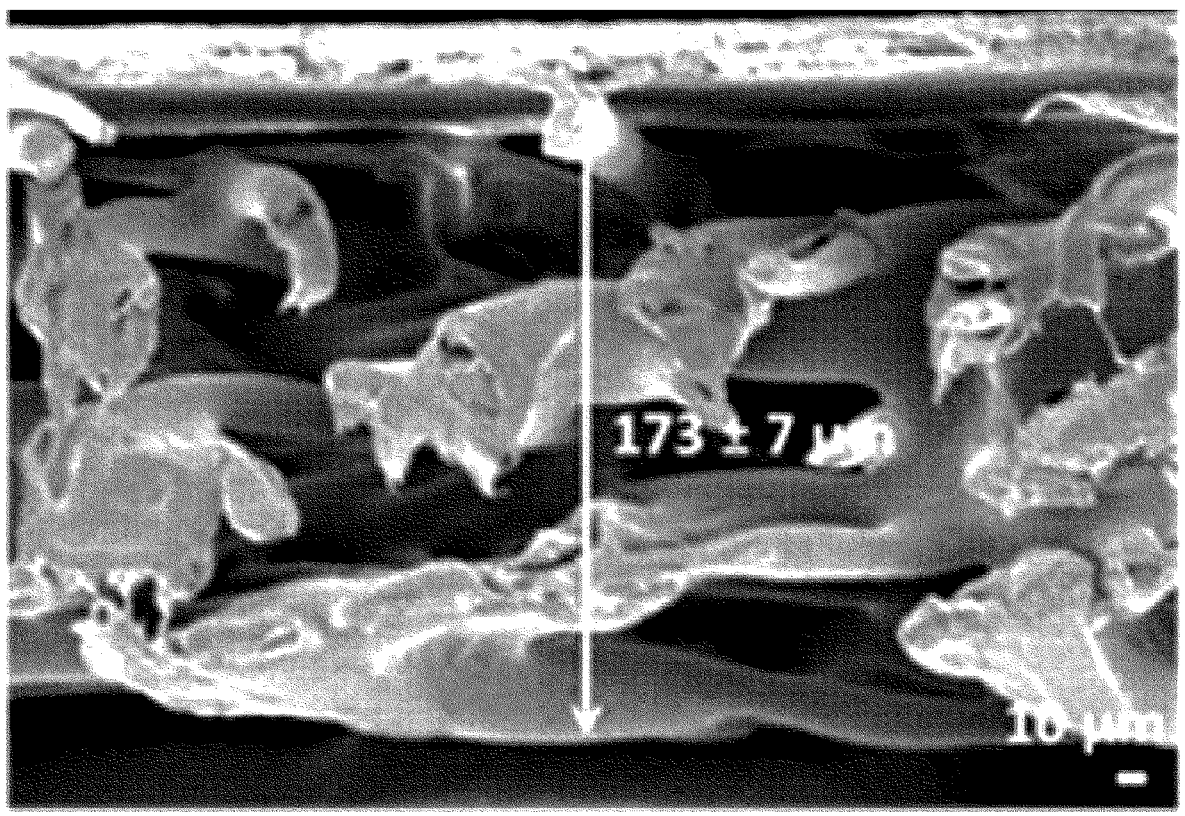
FIG. 5 is an SEM image of a cross section of a second support that includes a nanofiber web on one surface thereof and is included in one embodiment of the present invention.

The second support, in which the nanofiber web is laminated and provided on one surface of the second support by performing operation (1), may have a thickness of about 173±7 μm as shown in FIG. 5, and in this case, a scale bar of FIG. 5 may have a size of 10 μm.

Next, before operation (2) to be described below is performed, an operation of treating the nanofiber web with a hydrophilic coating layer-forming composition to form a hydrophilic coating layer may be further performed.

Specifically, the present operation may include treating the nanofiber web with the hydrophilic coating layer-forming composition and heat-treating the hydrophilic coating layer-forming composition to form the hydrophilic coating layer.

First, the hydrophilic coating layer-forming composition may include a hydrophilic component and a cross-linkable component. As an example, the hydrophilic coating layer-forming composition may include PVA, a crosslinking agent including a carboxyl group, and a solvent, as an example, water for dissolving the PVA and the crosslinking agent. The hydrophilic coating layer-forming composition may include 2 to 20 parts by weight of the crosslinking agent and 1,000 to 100,000 parts by weight of the solvent with respect to 100 parts by weight of the PVA.

Meanwhile, when the nanofiber forming the manufactured nanofiber web includes a fluorine-based compound, the fluorine-based compound may have strong hydrophobicity, and thus, even though the nanofiber web is treated with the above-described hydrophilic coating layer-forming composition, a coating layer may not be properly formed on a surface of the nanofiber web. Thus, in order to wet the hydrophilic coating layer-forming composition well on an outer surface of the nanofiber, the hydrophilic coating layer-forming composition may further include a wettability agent.

As the wettability agent, any component may be used without limitation as long as the component may improve the wettability of an outer surface of a hydrophobic nanofiber with respect to a hydrophilic solution and concurrently may be dissolved in the hydrophilic coating layer-forming composition. As an example, the wettability agent may include at least one component selected from the group consisting of isopropyl alcohol, ethyl alcohol, and methyl alcohol. In addition, the wettability agent may be included in an amount of 1,000 to 100,000 parts by weight with respect to 100 parts by weight of the PVA included in the hydrophilic coating layer-forming composition. When the wettability agent is included in an amount less than 1,000 parts by weight, the improvement of the wettability of the nanofiber is insignificant, and thus, the formation of the hydrophilic coating layer may not be smooth, and the hydrophilic coating layer may be frequently peeled off. In addition, when the wettability agent is included in an amount exceeding 100,000 parts by weight, a degree of improvement of the wettability may be insignificant, and concentrations of the PVA and the crosslinking agent included in the hydrophilic coating layer-forming composition are decreased so that the formation of the hydrophilic coating layer may not be smooth.

Meanwhile, a hydrophilic coating layer may be formed by pre-treating the nanofiber web with a wettability agent and then treating the nanofiber web with a hydrophilic coating layer-forming composition without providing the wettability agent in the hydrophilic coating layer-forming composition. However, when a nanofiber web in which a wettability agent is immersed in pores is immersed in a hydrophilic coating layer-forming composition, a time taken for the wettability agent immersed in the pores to escape from the nanofiber web and for the hydrophilic coating layer-forming composition to permeate the pores at the same time may be long, and thus a manufacturing time may be prolonged. In addition, since a degree of permeation of the hydrophilic coating layer-forming composition differs according to the thickness and pore diameter of the nanofiber web, a hydrophilic coating layer may be non-uniformly formed according to positions of a fiber web. Furthermore, as the hydrophilic coating layer is non-uniformly formed, the pores may be clogged in a portion of the nanofiber web by the hydrophilic coating layer, and in this case, an initially designed pore structure of the nanofiber web may be changed, and thus, a desired flow rate may not be obtained. Accordingly, the hydrophilic coating layer-forming composition, which includes the wettability agent, is beneficial for reducing a manufacturing time, simplifying a manufacturing process, and improving the formability of the hydrophilic coating layer at the same time without changing the pore structure of the nanofiber web.

As a method of forming the above-described hydrophilic coating layer-forming composition on the nanofiber web, any known coating method may be used without limitation, and as an example, an immersion method, a spraying method or the like may be used.

Afterward, an operation of heat-treating the hydrophilic coating layer-forming composition treated on the nanofiber web to form the hydrophilic coating layer may be performed. A process of drying a solvent of the hydrophilic coating layer-forming composition may be concurrently performed through the heat-treating. The heat-treating may be performed in a dryer, and in this case, a temperature of applied heat may be in a range of 80° C. to 160° C., and a treatment time may be in a range of 1 minute to 60 minutes, but the present invention is not limited thereto.

Next, as operation (2) according to the present invention, an operation of laminating by placing the laminate such that the second support is in contact with each of the upper and lower surfaces of the first support is performed.

Operation (2) may include 2-1) stacking the second support and the nanofiber web laminated in operation (1) on each of the both surfaces of the first support, and 2-2) fusing the first support and the second support by applying at least one of heat and pressure.

A known method may be adopted as a specific method of applying the heat and/or pressure in operation 2-2), and as a non-limiting example thereof, a common calendering process may be used. In this case, a temperature of the applied heat may be in a range of 70° C. to 190° C. In addition, when the calendering process is performed, the calendering process may be performed multiple times, and for example, primary calendering may be performed, and then, secondary calendering may be performed. Here, a degree of the heat and/or pressure applied in each calendering process may be the same or different. Bonding between the second support and the first support through heat fusion may be performed through operation 2-2) such that an additional adhesive or an adhesive layer may be omitted.

The present invention includes a filter unit implemented including the filter medium manufactured through the above-described manufacturing methods.

Figure 6A:
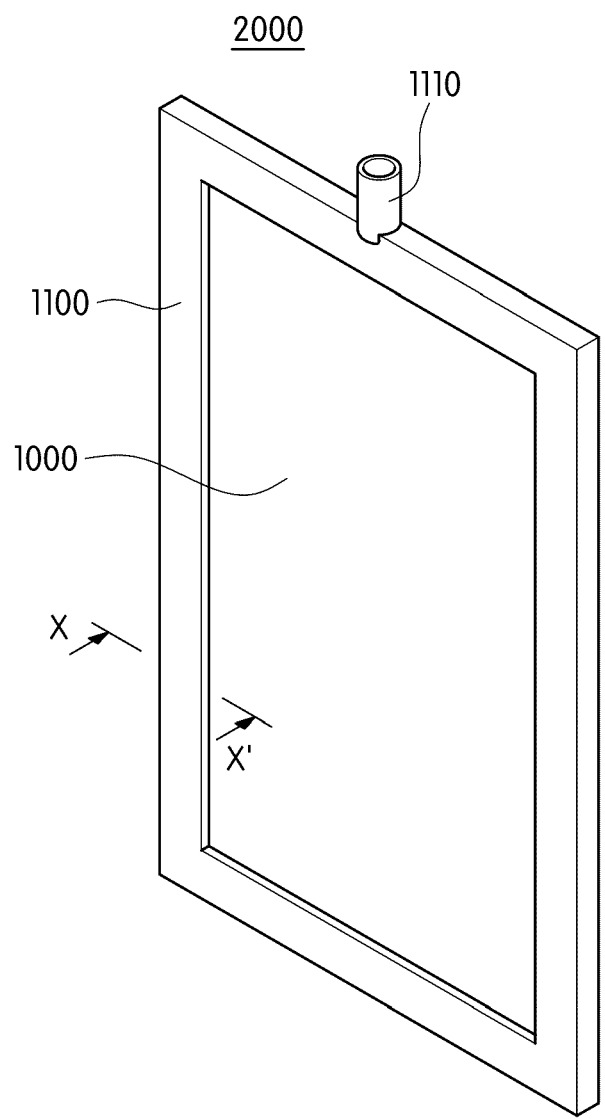

As shown in FIG. 6A, the filter medium 1000 may be implemented as a flat filter unit 2000. Specifically, the flat filter unit 2000 includes the filter medium 1000 and a support frame 1100 configured to support an edge of the filter medium 1000, and an inlet port 1110 may be provided in any one region of the support frame 1100 to allow a pressure difference between an outside and an inside of the filter medium 1000 to be gradient. In addition, a flow path may be formed in the support frame 1100 to allow a filtrate filtered in nanofiber webs 101 and 102 to be discharged to the outside through a support body 200 in which a second support and a first support are stacked in the filter medium 1000.

Figure 6B:
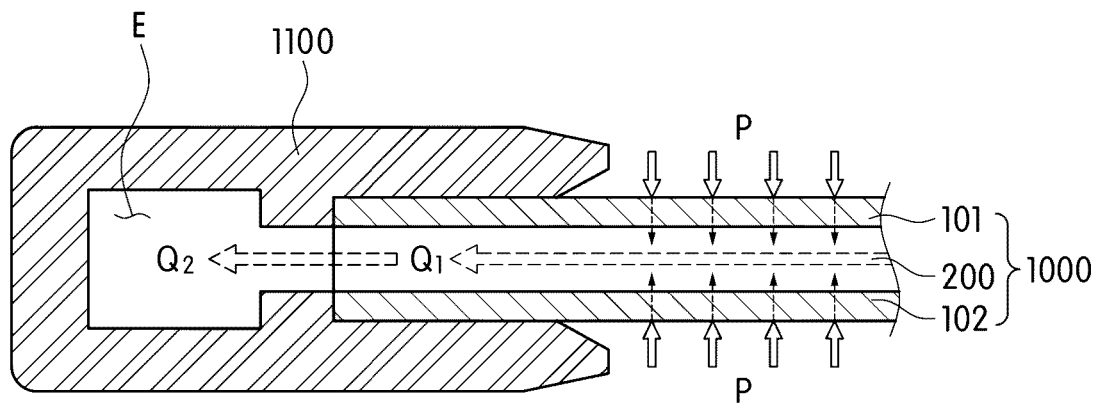

Specifically, when the filter unit 2000 shown in FIG. 6A is applied with a high-pressure suction force through the inlet port 1110, as shown in FIG. 6B, a filtrate P to be filtered, which is disposed outside the filter medium 1000, flows toward the inside of the filter medium 1000, a filtrate Q1 filtered through the nanofiber webs 101 and 102 flows along a flow path formed through the support body 200 formed by stacking the second support and the first support and then is introduced into a flow path E provided in the support frame 1100, and an introduced filtrate Q2 may be discharged to the outside through the inlet port 1110.

Further, a plurality of flat filter units 2000 as shown in FIG. 6A may be provided so as to be spaced apart from each other at predetermined intervals in one external case to implement a filter module. A plurality of such filter modules may be stacked/blocked again to form a large water treatment apparatus.

MODE OF THE INVENTION

The present invention will be described in more detail through the following examples, but the following examples do not limit the scope of the present invention, and it should be understood that the following examples are intended to assist the understanding of the present invention.

<Preparation Example: Hydrophilic Coating Layer-Forming Composition>

7,142 parts by weight of ultrapure water was mixed with respect to 100 parts by weight of PVA (PVA217, manufactured by Kuraray Co.) as a hydrophilic component, and then, the PVA was dissolved therein at a temperature of 80° C. for 6 hours using a magnetic bar to prepare a mixed solution. Thereafter, the mixed solution was cooled to room temperature, and then, polyacrylic acid-co-maleic acid (PAM, manufactured by Aldrich Co.) as a crosslinking agent was mixed into the mixed solution such that the polyacrylic acid-co-maleic acid was included in an amount of 15 parts by weight with respect to 100 parts by weight of the PVA and was dissolved at room temperature for 12 hours. Thereafter, isopropyl alcohol (IPA, manufactured by Duksan Chemical Co.) was added to the mixed solution such that the isopropyl alcohol was included in an amount of 7,142 parts by weight with respect to 100 parts by weight of the PVA and was mixed for 2 hours to prepare a hydrophilic coating layer-forming composition.

Example 1

First, in order to prepare a spinning solution, 12 g of polyvinylidene fluoride (Kynar 761, manufactured by Arkema Inc.) as a fiber-forming component was dissolved in 88 g of a mixed solution, which was obtained by mixing dimethylacetamide and acetone in a weight ratio of 70:30, at a temperature of 80° C. for 6 hours using a magnetic bar to prepare a mixed solution. The spinning solution was introduced into a solution tank of an electrospinning device and was discharged at a rate of 15 μl/min/hole. Here, the spinning solution was discharged while applying air in the same direction as a spinning direction of a spinning nozzle, a temperature of 30° C. and a humidity of 50% were maintained in a spinning section, and a distance between a collector and a spinning nozzle tip was 20 cm. A laminate including a nanofiber web formed of PVDF nanofibers having an average fiber diameter of 0.5 μm on one surface of a second support was manufactured by disposing a non-woven fabric (CCP40, NamYang Nonwoven Fabric Co.) having an average thickness of about 200 μm and a basis weight of 40 g/m² and formed of a low melting point composite fiber having an average fiber diameter of 15 μm and including a sheath portion formed of polyethylene having a melting point of about 120° C. and a core portion formed of polypropylene, as the second support, on the collector and then applying a voltage of 40 KV or more to a spin nozzle pack using a high voltage generator while simultaneously applying an air pressure of 0.03 MPa per spin pack nozzle. Next, in order to dry a solvent and moisture remaining in the nanofiber web of the laminate and thermally fuse the second support and the nanofiber web, a calendering process was performed by applying heat with a temperature of 140° C. or more and a pressure of 1 kgf/cm². The manufactured laminate had a shape as shown in FIG. 5 and the second support and the nanofiber web were bonded through thermal fusion. The nanofiber web had a shape as shown in FIGS. 4A and 4B and had a three-dimensional network structure. Here, the nanofiber web had an average pore diameter of 300 nm, an average thickness of 20 μm, and a basis weight of 10 g/m². In addition, a plurality of nanofibers provided in the nanofiber web had diameters whose standard deviation was 167.1 nm, the volume of pores having a pore diameter within an average pore diameter ±10% was 78% of the total volume of pores, and the volume of pores having a pore diameter within an average pore diameter ±5% was 53% of the total volume of the pores.

Thereafter, the manufactured laminate was immersed in the hydrophilic coating layer-forming composition prepared in Preparation Example and dried at a temperature of 110° C. for 5 minutes in a dryer to provide a hydrophilic coating layer on a nanofiber surface of the nanofiber web.

Thereafter, the manufactured laminate was disposed on each of both surfaces of a first support such that the second support faced the first support. Here, as the first support, a non-woven fabric (NP450, manufactured by Nam Yang Nonwoven Fabric Co.) formed of a low melting point composite fiber with an average fiber diameter of 35 μm including polyethylene as a sheath portion and polypropylene as a core portion, which had an average thickness of 5 mm, a basis weight of 500 g/m², and a melting point of about 120° C., was used. Afterward, a filter medium was manufactured by applying heat with a temperature of 140° C. or more and a pressure of 1 kgf/cm².

Examples 2 to 7 and Comparative Examples 1 to 2

Filter media as shown in Tables 1 and 2 were manufactured in the same manner as in Example 1, except that a standard deviation of diameters of a plurality of nanofibers provided in a nanofiber web, an average pore diameter, a volume of pores having a pore diameter within an average pore diameter ±10%, whether a second support is included, and the like were changed.

Experimental Example 1

The following physical properties of each of the filter media manufactured according to Examples 1 to 7 and Comparative Examples 1 to 2 were evaluated and shown in Tables 1 and 2.

1. Measurement of Relative Water Permeability

An operation pressure of 50 kPa was applied to a filter unit implemented using each of the filter media manufactured in Examples 1 to 7 and Comparative Examples 1 to 2, and water permeability per a specimen area of 0.5 m² was measured. Then, the water permeability of each of the filter media according to the remaining Examples and Comparative Examples was measured with respect to 100% of water permeability of the filter medium according to Example 1.

2. Evaluation of Filtration Efficiency

Test dust (ISO, A2 Fine Grade Test Dust) was dispersed in pure water to prepare a suspension having a turbidity of 100 NTU, and filtration efficiency was measured on a filter unit implemented using each of the filter media manufactured in Examples 1 to 7 and Comparative Examples 1 to 2 by measuring turbidity before and after filtration.

3. Evaluation of Backwashing Durability

The filter unit implemented using each of the filter media manufactured in Examples 1 to 7 and Comparative Examples 1 to 2 was immersed in water, and an operation pressure of 50 kPa was applied to perform backwashing under a condition in which 400 LMH of water per a specimen area of 0.5 m$^2$ was sprayed for 2 minutes. Then, backwashing durability was evaluated in such a manner that, when there was no abnormality, it was indicated as O, and when any problem such as a swelling phenomenon of a separation membrane or interlayer peeling occurred, it was indicated as X.

TABLE 1

| | Classification | Example 1 | Example 2 | Example 3 | Example 4 | Example 5 |
|---|---|---|---|---|---|---|
| Nanofiber web | Standard deviation for diameter (nm) | 167.1 | 291.4 | 233.6 | 160.5 | 164.2 |
| | Average pore diameter (nm) | 300 | 300 | 300 | 50 | 200 |
| | Volume of pores within average pore diameter ± 10% (%) | 78 | 67 | 71 | 71 | 74 |
| | Volume of pores within average pore diameter ± 5% (%) | 53 | 47 | 51 | 51 | 52 |
| Second support | Whether included | ○ | ○ | ○ | ○ | ○ |
| Filter medium | Relative water permeability (%) | 100 | 101 | 101 | 69 | 98 |
| | Filtration efficiency (%) | 97 | 82 | 91 | 99 | 97 |
| | Backwashing durability | ○ | ○ | ○ | X | ○ |

TABLE 2

| | Classification | Example 6 | Example 7 | Comparative Example 1 | Comparative Example 2 |
|---|---|---|---|---|---|
| Nanofiber web | Standard deviation for diameter (nm) | 182.8 | 198.9 | 345.5 | 167.1 |
| | Average pore diameter (nm) | 800 | 1200 | 300 | 300 |
| | Volume of pores within average pore diameter ±10% (%) | 73 | 62 | 50 | 78 |
| | Volume of pores within average pore diameter ±5% (%) | 52 | 47 | 34 | 53 |
| Second support | Whether included | ○ | ○ | ○ | X |
| Filter medium | Relative water permeability (%) | 115 | 134 | 104 | 103 |
| | Filtration efficiency (%) | 91 | 62 | 68 | 94 |
| | Backwashing durability | ○ | X | X | X |

As can be seen from the above-described Table 1 and Table 2, it was found that Examples 1 to 3, Examples 5 and 6, which satisfy all of the standard deviation for the diameters of the plurality of nanofibers provided in the nanofiber web according to the present invention, the average pore diameter, the volume of the pores having the pore diameter within the average pore diameter ±10%, and whether the second support is included, were concurrently and considerably excellent in all of the water permeability, filtration efficiency, and backwashing durability as compared to Examples 4 and 7, and Comparative Examples 1 and 2 from which even one among such factors was omitted.

Example 8

First, in order to prepare a spinning solution, 12 g of polyvinylidene fluoride (Kynar 761, manufactured by Arkema Inc.) as a fiber-forming component was dissolved in 88 g of a mixed solution, which was obtained by mixing dimethylacetamide and acetone in a weight ratio of 70:30, at a temperature of 80° C. for 6 hours using a magnetic bar to prepare a mixed solution. The spinning solution was introduced into a solution tank of an electrospinning device and was discharged at a rate of 15 μl/min/hole. Here, the spinning solution was discharged while applying air in the same direction as a spinning direction of a spinning nozzle, a temperature of 30° C. and a humidity of 50% were maintained in a spinning section, and a distance between a collector and a spinning nozzle tip was 20 cm. A laminate including a nanofiber web formed of PVDF nanofibers having an average fiber diameter of 0.5 μm on one surface of a second support was manufactured by disposing a non-woven fabric (CCP40, Nam Yang Nonwoven Fabric Co.) having an average thickness of about 200 μm and a basis weight of 40 g/m$^2$ and formed of a low melting point composite fiber having an average fiber diameter of 15 μm and including a sheath portion formed of polyethylene having a melting point of about 120° C. and a core portion formed of polypropylene, as the second support, on the collector and then applying a voltage of 40 KV or more to a spin nozzle pack using a high voltage generator while simultaneously applying an air pressure of 0.03 MPa per spin pack nozzle. Next, in order to dry a solvent and moisture remaining in the nanofiber web of the laminate and thermally fuse the second support and the nanofiber web, a calendering process was performed by applying heat with a temperature of 140° C. or more and a pressure of 1 kgf/cm$^2$. The manufactured laminate had a shape as shown in FIG. 5 and the second support and the nanofiber web were bonded through thermal fusion. The nanofiber web had a shape as shown in FIGS. 4A and 4B and had a three-dimensional network structure. Here, the nanofiber web had an average pore diameter of 300 nm, a porosity of 80%, an average thickness of 20 μm, and a basis weight of 10 g/m$^2$. In addition, a tensile strength in an MD direction of the nanofiber web was 4 kg/mm$^2$, and a tensile strength in a TD direction was 2.5 kg/mm$^2$.

Thereafter, the manufactured laminate was immersed in the hydrophilic coating layer-forming composition prepared in Preparation Example and dried at a temperature of 110° C. for 5 minutes in a dryer to provide a hydrophilic coating layer on a nanofiber surface of the nanofiber web.

Thereafter, the manufactured laminate was disposed on each of both surfaces of a first support such that the second support faced the first support. Here, as the first support, a non-woven fabric (NP450, manufactured by NamYang Non-woven Fabric Co.) formed of a low melting point composite fiber with an average fiber diameter of 35 μm including polyethylene as a sheath portion and polypropylene as a core portion, which had an average thickness of 4 mm, a basis weight of 500 g/m², and a melting point of about 120° C., was used. Afterward, a filter medium was manufactured by applying heat with a temperature of 140° C. or more and a pressure of 1 kgf/cm².

Examples 9 to 18 and Comparative Example 3

Filter media as shown in Table 3 and 4 were manufactured in the same manner as in Example 8 while changing tensile strength in an MD direction of the nanofiber web, tensile strength and porosity in a TD direction, and the like.

Experimental Example 2

The following physical properties of each of the filter media manufactured according to Examples 8 to 18 and Comparative Example 3 were evaluated and shown in Tables 3 and 4.

1. Standard Deviation and Average Tensile Strength of Tensile Strength in MD Direction The nanofiber web provided in the filter medium manufactured according to each of Examples 8 to 18 and Comparative Example 3 was cut to a size of 250 mm×150 mm (width×length) and then divided into ten equal portions in an MD direction to form a first region to a tenth region. The average tensile strength in the MD direction was obtained by calculating an average value by summing and averaging the value of a measured tensile strength of a central portion of each of the first to tenth regions. Then, each "variance" value, which was obtained by subtracting the value of the average tensile strength in the MD direction from the value of the tensile strength of the central portion of each of the first to tenth regions, was squared, and then summed and averaged to calculate a "deviation" value. The standard deviation of the tensile strength in the MD direction was obtained by applying the square root to the "variance" value. Here, the tensile strength was measured at a temperature of 25° C. through a tensile strength tester (HZ-1007E, manufactured by MMS Tech Co.) at a rate of 20 mm/min.

2. Standard Deviation and Average Tensile Strength of Tensile Strength in TD Direction The nanofiber web provided in the filter medium manufactured according to each of Examples 8 to 18 and Comparative Example 3 was cut to a size of 150 mm×250 mm (width×length) and then divided into ten equal portions in a TD direction to form a first region to a tenth region. The average tensile strength in the TD direction was obtained by calculating an average value by summing and averaging the value of a measured tensile strength of a central portion of each of the first to tenth regions. Then, each "variance" value, which was obtained by subtracting the value of the average tensile strength in the TD direction from the value of the tensile strength of the central portion of each of the first to tenth regions, was squared, and then summed and averaged to calculate a "deviation" value. The standard deviation of the tensile strength in the TD direction was obtained by applying the square root to the "variance" value. Here, the tensile strength was measured at a temperature of 25° C. through a tensile strength tester (HZ-1007E, manufactured by MMS Tech Co.) at a rate of 20 mm/min.

Experimental Example 3

The following physical properties of each of the filter media manufactured according to Examples 8 to 18 and Comparative Example 3 were evaluated and shown in Tables 3 and 4.

1. Measurement of Relative Water Permeability

An operation pressure of 50 kPa was applied to a filter unit implemented using each of the filter media manufactured in Examples 8 to 18 and Comparative Example 3, and water permeability per a specimen area of 0.5 m² was measured. Then, water permeability of each of the filter media according to the remaining Examples and Comparative Examples was measured with respect to 100% of water permeability of the filter medium according to Example 8.

2. Evaluation of Filtration Efficiency

Test dust (ISO, A2 Fine Grade Test Dust) was dispersed in pure water to prepare a suspension having a turbidity of 100 NTU, and filtration efficiency was measured on a filter unit implemented using each of the filter media manufactured in Examples 8 to 18 and Comparative Example 3 by measuring turbidity before and after filtration.

3. Evaluation of Water Treatment Durability

Water treatment durability was evaluated for the filter unit implemented using each of the filter media manufactured in Examples 8 to 18 and Comparative Example 3 in such a manner that, when there was no abnormality in water permeability measurement and filtration efficiency evaluation, it was indicated as O, and when any problem such as damage or breakage of the nanofiber, deformation of the nanofiber web, or the like occurred, it was indicated as X.

4. Evaluation of Backwashing Durability

The filter unit implemented using each of the filter media manufactured in Examples 8 to 18 and Comparative Example 3 was immersed in water, and an operation pressure of 50 kPa was applied to perform backwashing under a condition in which 400 LMH of water per a specimen area of 0.5 m² was sprayed for 2 minutes. Then, backwashing durability was evaluated in such a manner that, when there was no abnormality, it was indicated as O, and when any problem such as a swelling phenomenon of a separation membrane or interlayer peeling occurred, it was indicated as X.

TABLE 3

| | Classification | Example 8 | Example 9 | Example 10 | Example 11 | Example 12 | Example 13 |
|---|---|---|---|---|---|---|---|
| Nanofiber web | Tensile strength in TD direction (kg/mm²) | 2 | 6 | 3 | 1.3 | 0.2 | 0.5 |
| | Tensile strength in MD direction (kg/mm²) | 5 | 6.6 | 4.5 | 6.5 | 1.6 | 2 |

TABLE 3-continued

| | Classification | | Example 8 | Example 9 | Example 10 | Example 11 | Example 12 | Example 13 |
|---|---|---|---|---|---|---|---|---|
| | | TD:MD | 1:2.5 | 1:1.1 | 1:1.5 | 1:5 | 1:8 | 1:4 |
| | | Porosity (%) | 75 | 44 | 77 | 81 | 88 | 84 |
| | MD direction | Standard deviation of tensile strength (kg/mm$^2$, $\sigma_{MD}$) | 0.1 | 0.22 | 0.16 | 0.2 | 0.1 | 0.1 |
| | | Average tensile strength (kg/mm$^2$, $A_{MD}$) | 5 | 6.6 | 4 | 6.5 | 1.6 | 2 |
| | Equation 1 | $\sigma_{MD}/A_{MD}$ | 0.02 | 0.033 | 0.04 | 0.031 | 0.063 | 0.05 |
| | TD direction | Standard deviation of tensile strength (kg/mm$^2$, $\sigma_{TD}$) | 0.08 | 0.24 | 0.08 | 0.03 | 0.015 | 0.025 |
| | | Average tensile strength (kg/mm$^2$, $A_{TD}$) | 2 | 6 | 2 | 1.3 | 0.2 | 0.5 |
| | Equation 2 | $\sigma_{TD}/A_{TD}$ | 0.035 | 0.04 | 0.04 | 0.023 | 0.075 | 0.5 |
| Filter unit | Relative water permeability (%) | | 100 | 55 | 99 | 102 | — | 105 |
| | Filtration efficiency (%) | | 97 | 98 | 97 | 94 | — | 89 |
| | Water treatment durability | | ○ | ○ | ○ | ○ | x | ○ |
| | Backwashing durability | | ○ | x | ○ | ○ | x | ○ |

TABLE 4

| | Classification | | Example 14 | Example 15 | Example 16 | Example 17 | Example 18 | Comparative Example 3 |
|---|---|---|---|---|---|---|---|---|
| Nanofiber web | Tensile strength in TD direction (kg/mm$^2$) | | 4 | 0.4 | 0.6 | 3 | 2 | 4 |
| | Tensile strength in MD direction (kg/mm$^2$) | | 6 | 0.6 | 1 | 8 | 5 | 0.9 |
| | | TD:MD | 1:1.5 | 1:1.5 | 1:1.67 | 1:2.67 | 1:2.5 | 1:0.23 |
| | | Porosity (%) | 67 | 89 | 85 | 51 | 36 | 83 |
| | MD direction | Standard deviation of tensile strength (kg/mm$^2$, $\sigma_{MD}$) | 0.21 | 0.012 | 0.05 | 0.3 | 0.7 | 0.03 |
| | | Average tensile strength (kg/mm$^2$, $A_{MD}$) | 6 | 0.6 | 1 | 8 | 5 | 0.9 |
| | Equation 1 | $\sigma_{MD}/A_{MD}$ | 0.035 | 0.02 | 0.05 | 0.38 | 0.14 | 0.033 |
| | TD direction | Standard deviation of tensile strength (kg/mm$^2$, $\sigma_{TD}$) | 0.17 | 0.01 | 0.03 | 0.08 | 0.3 | 0.1 |
| | | Average tensile strength (kg/mm$^2$, $A_{TD}$) | 4 | 0.4 | 0.6 | 3 | 2 | 4 |
| | Equation 2 | $\sigma_{TD}/A_{TD}$ | 0.043 | 0.025 | 0.05 | 0.027 | 0.15 | 0.025 |
| Filter unit | Relative water permeability (%) | | 87 | — | 103 | 72 | 117 | 98 |
| | Filtration efficiency (%) | | 98 | — | 91 | 98 | 69 | 96 |
| | Water treatment durability | | ○ | x | ○ | ○ | ○ | ○ |
| | Backwashing durability | | ○ | x | ○ | x | ○ | x |

As can be seen from the above-described Table 3 and Table 4, it was found that Examples 8, 10, 11, 13, 14, and 16, which satisfy all of the tensile strength in the MD direction, the tensile strength in the TD direction, porosity, and the ranges of the Equation 1 and Equation 2 of the nanofiber web, were concurrently and considerably excellent in all of the relative water permeability, filtration efficiency, and backwashing durability as compared to Examples 9, 12, 15, 17, and 18 and Comparative Example 3 from which even one among such factors was omitted.

In particular, Example 12 and Example 15 failed measurements of water permeability and filtration efficiency because the water treatment durability was significantly degraded.

Although one embodiment of the present invention has been described above, the concept of the present invention is not limited to the embodiments disclosed herein. Other embodiments may be easily perceived by those skilled in the art by adding, changing, deleting, supplementing, and the like a component within an equivalent range of the concept and should be included in the scope of the present invention.

The invention claimed is:

1. A filter medium comprising:
   a porous first support;
   nanofiber webs each stacked above and below the first support and formed of a plurality of nanofibers having diameters whose standard deviation is 300 nm or less; and
   porous second supports interposed between the first support and the nanofiber webs
   wherein each of the second supports includes a second composite fiber including a support component and a low melting point component and disposed such that at least a portion of the low melting point component is exposed at an outer surface thereof, and the low melting point component of the second composite fiber is fused to the nanofiber web,
   wherein the first support includes first composite fiber including a support component and a low melting point component and disposed such that at least a portion of the low melting point component is exposed at an outer surface thereof, and the low melting point component of the first composite fiber and the low melting point component of the second composite fiber are fused to each other to bond the first support and the second support, wherein the nanofiber webs have an average pore diameter of 100 nm to 1000 nm, and wherein a volume of pores having a pore diameter within the average pore diameter ±10% is 60% or more of the total volume of pores of the nanofiber web.

2. The filter medium of claim 1, wherein the plurality of nanofibers provided in the nanofiber webs have diameters whose standard deviation is 200 nm or less.

3. The filter medium of claim 1, wherein the nanofiber has an average fiber diameter of 0.05 μm to 1 μm.

4. The filter medium of claim 1, wherein a volume of pores having a pore diameter within the average pore diameter ±5% is 45% more of the total volume of pores of the nanofiber web.

5. The filter medium of claim 1, wherein the nanofiber webs have a porosity of 60% to 90%, a basis weight of 0.05 g/m$^2$ to 20 g/m$^2$, and a thickness of 0.5 μm to 200 μm.

6. The filter medium of claim 1, wherein the first support and the second support are each independently selected from the group consisting of a non-woven fabric, a fabric, and a knitted fabric.

7. The filter medium of claim 1, wherein
the first support has a basis weight of 250 g/m$^2$ to 800 g/m$^2$ and a thickness of 2 mm to 8 mm, and
the second support has a basis weight of 35 g/m$^2$ to 80 g/m$^2$ and a thickness of 150 μm to 250 μm.

8. The filter medium of claim 1, wherein
the first support has an average fiber diameter of 5 μm to 50 μm, and
the second support has an average fiber diameter of 5 μm to 30 μm.

* * * * *